(12) United States Patent
Manvar et al.

(10) Patent No.: US 10,977,274 B2
(45) Date of Patent: Apr. 13, 2021

(54) UNIFIED REPLICATION AND RECOVERY

(71) Applicant: Sungard Availability Services, LP, Wayne, PA (US)

(72) Inventors: Amol Manvar, Maharashtra (IN); Krunal Jain, Maharashtra (IN); Nandkumar Mane, Maharashtra (IN); Rahul Rege, Maharashtra (IN)

(73) Assignee: Sungard Availability Services, LP, Wayne, PA (US)

( * ) Notice: Subject to any disclaimer, the term of this patent is extended or adjusted under 35 U.S.C. 154(b) by 585 days.

(21) Appl. No.: 15/725,395

(22) Filed: Oct. 5, 2017

(65) Prior Publication Data
US 2019/0108266 A1 Apr. 11, 2019

(51) Int. Cl.
*G06F 17/00* (2019.01)
*G06F 16/27* (2019.01)
*G06F 11/14* (2006.01)
*G06F 16/25* (2019.01)

(52) U.S. Cl.
CPC .......... *G06F 16/27* (2019.01); *G06F 11/1464* (2013.01); *G06F 16/258* (2019.01); *G06F 2201/805* (2013.01)

(58) Field of Classification Search
CPC .......... G06F 16/13; G06F 16/24; G06F 16/27; G06F 16/156; G06F 16/178; G06F 16/258; H04W 56/00
See application file for complete search history.

(56) References Cited

U.S. PATENT DOCUMENTS

| | | | |
|---|---|---|---|
| 6,260,190 B1 * | 7/2001 | Ju | G06F 8/445 712/205 |
| 7,392,421 B1 | 6/2008 | Bloomstein et al. | |
| 8,706,833 B1 | 4/2014 | Bergant et al. | |
| 9,063,994 B1 | 6/2015 | Natanzon et al. | |
| 9,135,120 B1 | 9/2015 | Natanzon et al. | |
| 9,696,939 B1 | 7/2017 | Frank et al. | |
| 10,489,248 B1 * | 11/2019 | Javadekar | G06F 3/067 |
| 2002/0156987 A1 | 10/2002 | Gajjar et al. | |
| 2006/0190766 A1 | 8/2006 | Adler et al. | |
| 2007/0233828 A1 | 10/2007 | Gilbert | |
| 2009/0307166 A1 | 12/2009 | Routray et al. | |

(Continued)

OTHER PUBLICATIONS

International Search Report and Written Opinion dated Jan. 8, 2019, PCT/US2018/053842.

(Continued)

*Primary Examiner* — Hung D Le
(74) *Attorney, Agent, or Firm* — David J. Thibodeau, Jr.; VLP Law Group LLP

(57) ABSTRACT

In one example, a system and method for replication and recovery of protected resources may include one or more vendor neutral components that identify a corresponding vendor specific replication and/or recovery tool. The vendor specific tool is then executre to obtain replication data related to the protected logical entity. The replication data is formatted in a vendor neutral format, and forwarded to a target site over a data transport mechanism. The target site can then reformat the replication data into the appropriate vendor specific formats required on the target site (which may not be the same vendor or vendor formats on the source site), and proceed to recover and/or replicate the protected resources.

13 Claims, 16 Drawing Sheets

(56) References Cited

U.S. PATENT DOCUMENTS

| | | | |
|---|---|---|---|
| 2011/0099420 A1* | 4/2011 | MacDonald McAlister | G06F 11/2082 714/6.32 |
| 2012/0011176 A1 | 1/2012 | Aizman et al. | |
| 2012/0245734 A1* | 9/2012 | Yun | B62D 57/032 700/253 |
| 2013/0295953 A1* | 11/2013 | Madsen | G01S 19/16 455/456.1 |
| 2013/0343180 A1* | 12/2013 | Kini | H04L 45/22 370/228 |
| 2014/0195554 A1* | 7/2014 | Desai | G06F 16/24 707/758 |
| 2016/0210308 A1* | 7/2016 | Shekhar | G06F 3/065 |
| 2016/0299818 A1* | 10/2016 | Vijayan | G06F 16/113 |
| 2017/0083539 A1* | 3/2017 | Saxena | G06F 11/1469 |
| 2017/0212811 A1* | 7/2017 | Kashnikov | G06F 16/113 |

OTHER PUBLICATIONS

Mell et al., "The NIST Definition of Cloud Computing," NIST Special Publication 800-145.

* cited by examiner

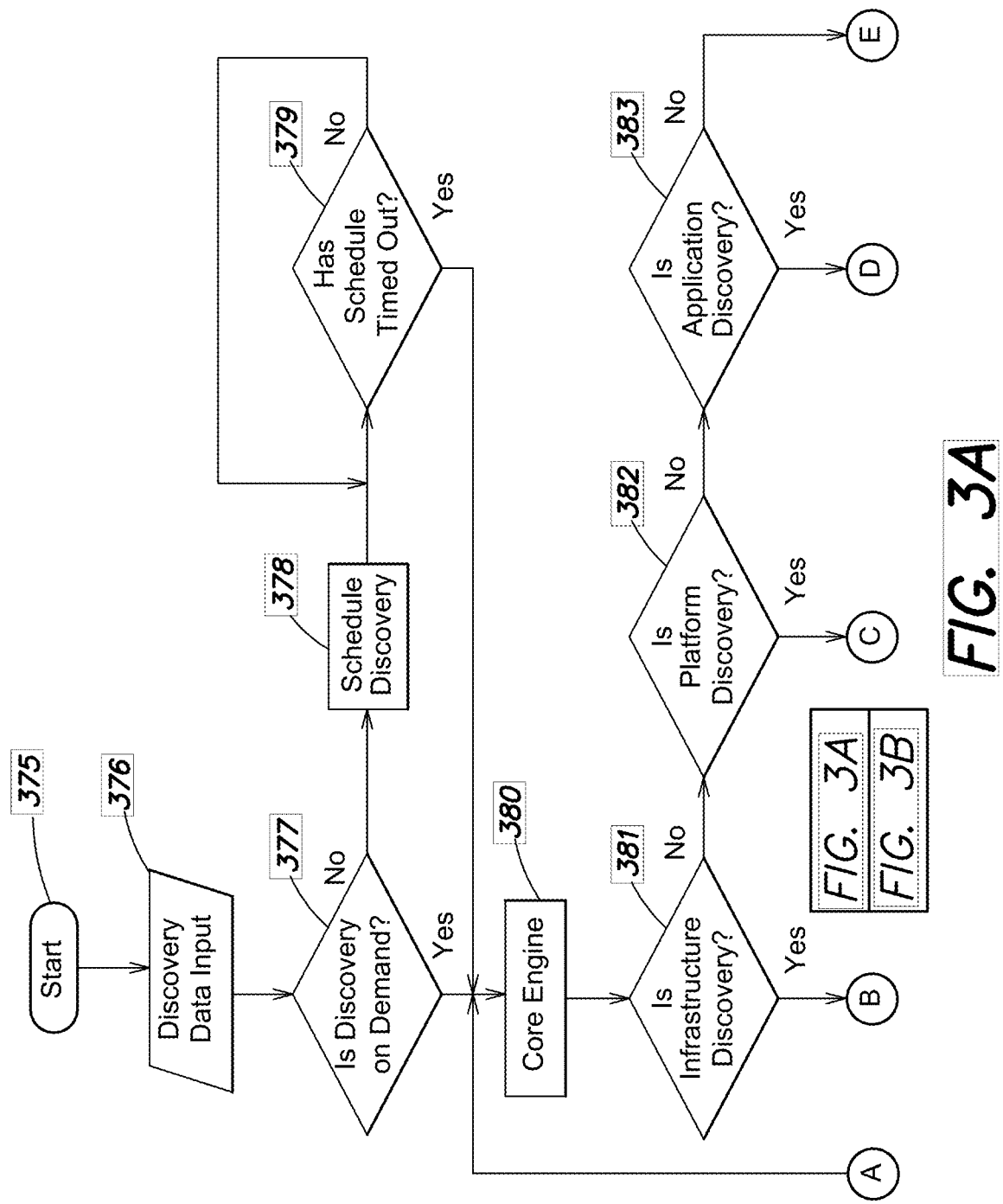

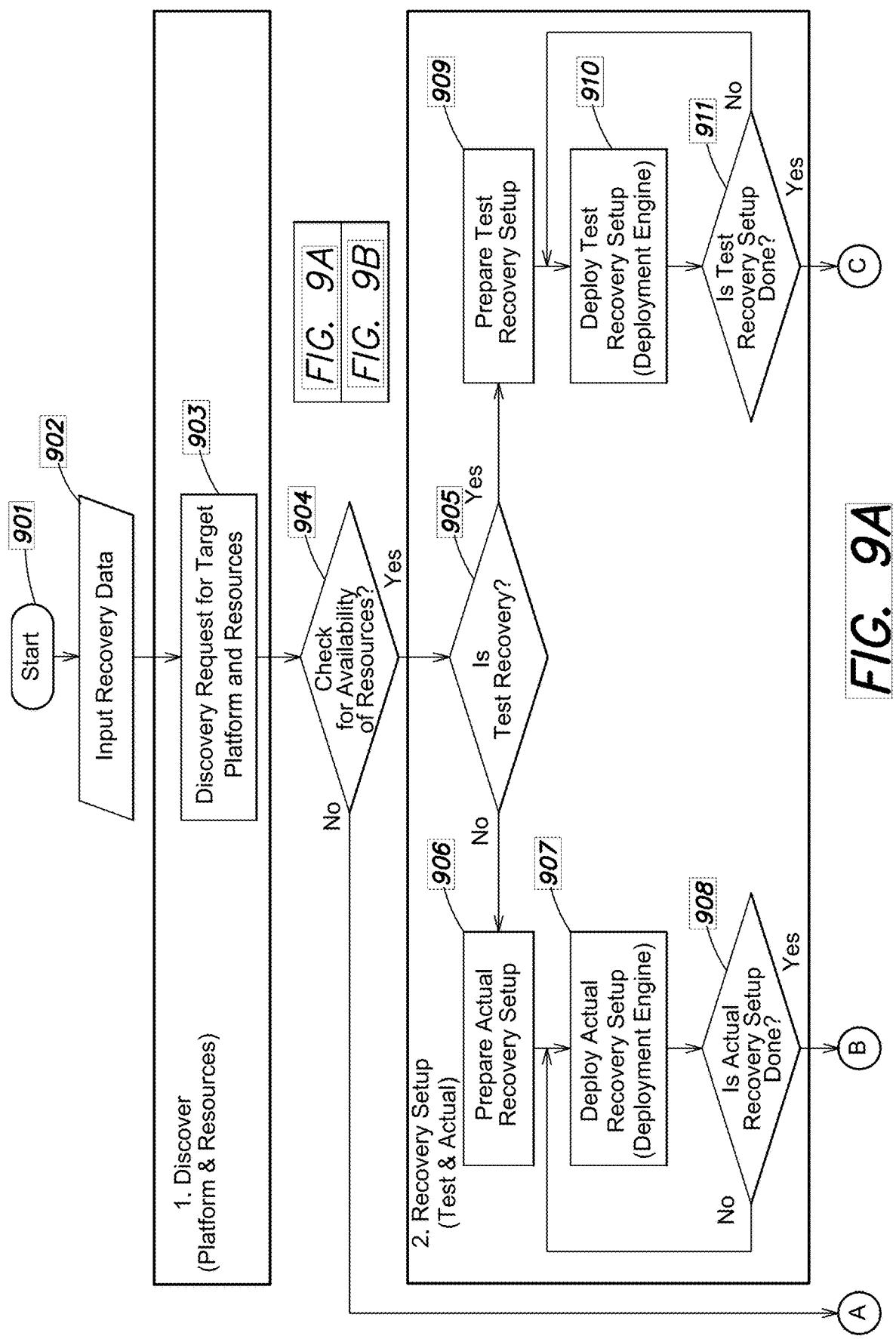

UNIFIED REPLICATION AND RECOVERY

BACKGROUND

This patent application relates to information technology and in particular to replication and recovery techniques.

Recovering a set of Information Technology (IT) systems can become a relatively complex problem. This is due at least in part to the fact that the underlying infrastructure it not always implemented with disaster recovery in mind. Disaster recovery solutions may not even be implemented at all, even where business criticality would otherwise dictate the necessity of such solutions.

One common disaster recovery approach protects the individual computer systems. These operate by capturing system state information and then re-creating the system state on a recovery computer. In the case of a disaster event, this approach can bring up that recovery computer in the desired state.

Disaster recovery operations are in many installations a primarily manual operation. For highly virtualized environments and cloud-based applications, some vendors provide available tools that leverage automation procedures. However those solutions are specific to particular vendors. In addition, a large portion of enterprise IT is still not virtualized. For such environments, the only option is to manually codify recovery procedures for each and every application in each and every data center scenario. This becomes very labor-intensive, time-consuming and error-prone process.

In other instances, different vendor solutions are chosen depending upon specific implementation needs. However this approach can also require much manual intervention to choose the right replication solution and to ensure it remains operational when configurations change.

SUMMARY

An example enterprise environment may have many thousands of compute devices and hundreds of installed software applications to support. The typical enterprise also uses many different types of data processors, networking devices, operating systems, storage devices, data backup solutions, cloud services, and other resources. What is important to consider protecting logical entities such as the applications, workloads, and workload consistency groups. Protection of these logical entities is more critical than protecting individual computer systems or devices without any context. A more sophisticated approach to protecting business critical functions thus also protects any inter-interrelationships between one or more such protected logical entities.

Often the protection of these logical entities demands the inventory of a complete installation with an in-depth understanding of the infrastructure topologies that support them. These toplogies may include entities such as networks, applications, storage devices, processors, and so forth, and maintaining an inventory of their attributes can require a lot of effort. A knowledgeable person must first spend time understanding the systems and then designing a replication and recovery solution based on the overall environment, integrating the solution with available technologies.

There are diverse solutions based on patterns of customer infrastructure which may or may not be compatible with one another, may or may not provide complete end-to-end replication recovering, do not necessarily define common protocol that would work as in any configurable environment, and do not facilitate plugging into existing solutions and provide common interfaces to users.

The present application provides a solution to these problems with a unified replication and recovery approach. A common protocol defines a process for replication and recovery at a high level of abstraction, wrapping around available replication and/or recovery toolsets available for IT infrastructure elements from various vendors. The result is a homogenous encapsulated interface that free the user from specific vendor lock-in. The approach also provides a mechanism to convert a set of discovered infrastructure artifacts into a homogenous state in the form of replication-recovery units, enabling a mechanism to rebuild the recovered entities from that homogenous state.

More specifically, automated unified recovery and replication is provided by defining a precise protocol between a source site and a target (recovery) site. Discovered data and metadata regarding the protected resources is captured in the form of a unified template which is then passed to the target site. The target site in turn can then interpret the template and take care of automated failover. In a preferred arrangement, the templates encapsulate or marshal the required details of the discovered resources into a generic, uniform format we call replication data units. The needed recovery objects on the target site can then be deployed by un-marshaling the replication data units.

In one example, a system and method for replication and recovery of protected resources may include one or more vendor neutral components to identify a corresponding vendor specific replication and/or recovery tool associated with the protected logical entity or entities. The system and method then initiates execution of the appropriate vendor specific tool to thereby obtain replication data related to the protected logical entity. The replication data is then formatted in a vendor neutral format, and forwarded to a target site over a data transport mechanism. The target site can then reformat the replication data into the appropriate vendor specific formats required on the target site (which may not be the same vendor or vendor formats on the source site), and proceed to recover and/or replicate the protected resources.

In some implementations, the vendor neutral component may include a discovery component for discovering a protected logical entity. The protected logical entities discovered may consist of infrastructure, platform, application, data, or metadata (with the metadata related to a vendor-specific discovery tool associated with the logical entity.)

The vendor neutral component may also be a replication component responsible for replicating infrastructure, platform, application, data, or metadata logical entities.

The vendor neutral component may also be a deployment component that is responsible for deploying one or more storage, compute, virtual appliance, or other resource at the target site.

The vendor neutral component may also be a recovery component responsible for converting the replication data to a vendor neutral format on the source site, and then recover the data and recover and or replicate the protected logical entity on the target site.

The vendor neutral component may also included a planning component for specifying a recovery plan for the protected logical entity.

In other embodiments, replication and recovery of protected resources may proceed as follows. At the source site, the vendor neutral discovery component is executed to identify one or more vendor specific tools for discovering aspects of the protected resources. Again, the protected resources may include one or more aspects of an infrastructure, platform, storage, network, or virtual machine protected resource. Next, the deployment component may be executed for deploying one or more vendor specific discovery tools on the source site. In optional aspects, the vendor component(s) may be deployed according to a schedule, or on demand. The discovery component obtains data related to the protected resources. Then, one or more replication data units are generated from the data determined by the discovery component. The replication data units contain data representing artifacts of the protected resources in a vendor neutral data format. These replication data units are then forwarded, using a transport mechanism, to a destination site. The destination site then receives the replication data units and executes a recovery component to convert the data units into vendor specific deployment recovery units. Deployment components on the target site then produce the vendor specific information to orchestrate a set of destination resources and recover the protected resources. Replication may be initiated on the target site either immediately before the step of executing the deployment component, or after receipt of the data units from the transport mechanism.

BRIEF DESCRIPTION OF THE DRAWINGS

FIGS. 3A and 3B are a detailed flow diagram for a discovery component.

FIGS. 9A and 9B are a recovery flow diagram.

DETAILED DESCRIPTION OF AN EMBODIMENT

Figure 1:
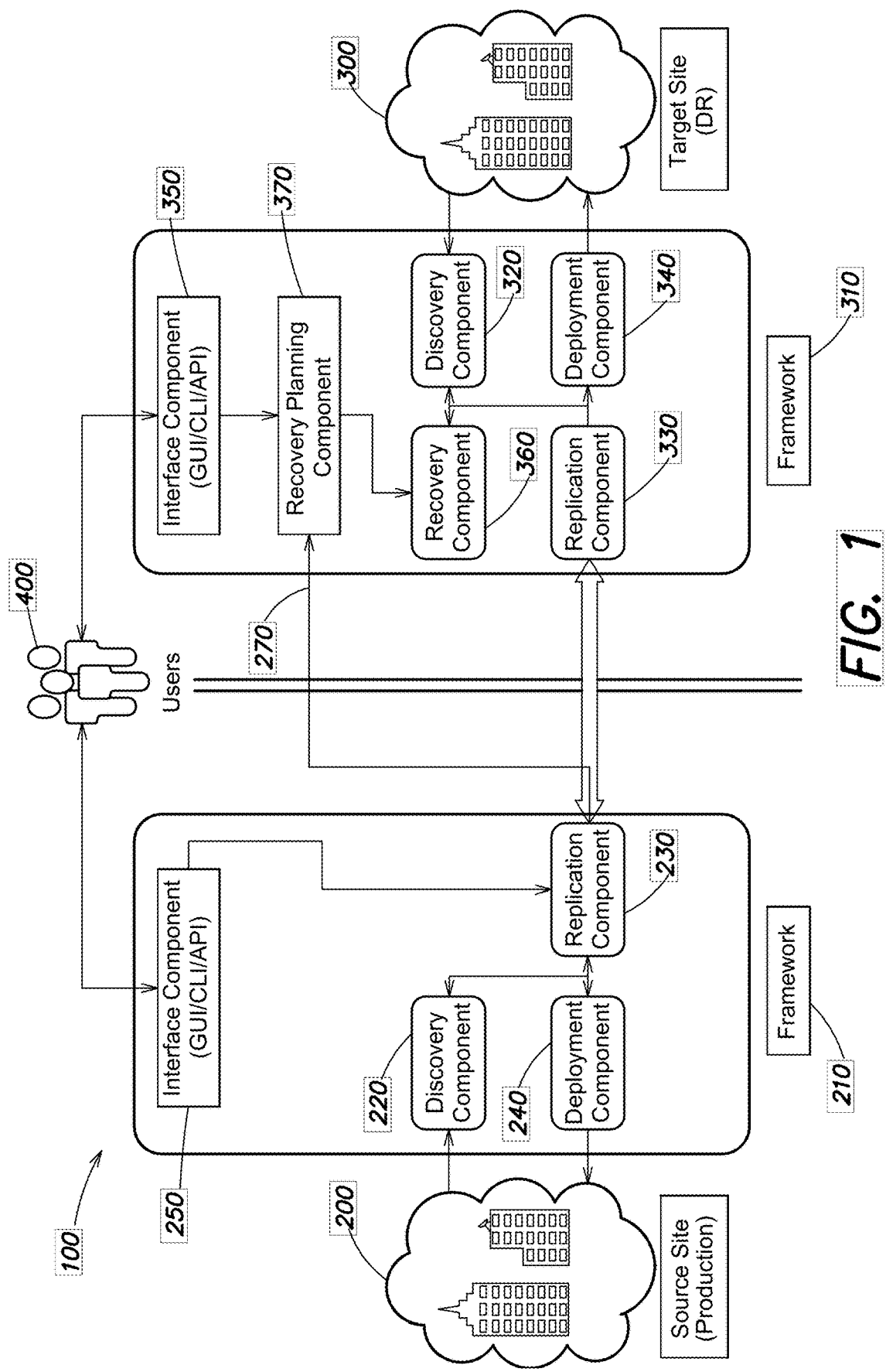
FIG. 1 is a high-level diagram of a unified replication and recovery environment.

Turning attention now to the drawings, FIG. 1 is a high-level diagram of an example Information Technology (IT) environment 100 that implements unified replication and/or recovery techniques as described herein. The example environment 100 consists of a source site 200 and a target site 300 (also referred to herein as a destination site or recovery site). The source site 100 contains a number of logical entities which may include infrastructure, platforms, applications, data, metadata and others logical entities. At least some of the logical entities are designated to be protected logical entities for which replication and/or recovery procedures are implemented. At high level, the replication and/or recovery solution includes three aspects:

A set of replication and recovery engine components;
A Unified Replication and Recovery Protocol; and
Protocol Data Units
Each of these is now described in more detail.

a) Replication and Recovery Engine Components.

The various replication and recovery engine components as shown in FIG. 1 participate in the execution of the unified replication and recover protocol. These components are independent in the nature of their operation in the sites 200, 300 and may work on generic (non-vendor specific) inputs provided to them through interfaces 250, 350.

More particularly, a source framework 210 deployed on the source site 200 includes a number of replication and recovery engine components. These include a discovery component 220, a replication component 230, a deployment component 240, and an interface component 250. A corresponding destination framework 310 on the target site 300 includes replication and recovery engine components such as a discovery component 320, a replication component 330, a deployment component 340, interface component 350, a recovery component 360, and a recovery planning component 370. A transport mechanism 270 allows for communicating information, typically in the form of Protocol Data Units (as described in detail below), between the frameworks 210 and 310.

Users 400 provide input to the replication and recovery engine components via respective interface components 250, 350 that may include one or more interface types (Graphical User Interfaces, Command Line Interface(s), and/or Application Programming Interface(s)). The user input provides information to guide the unified replication and recovery procedures described in detail below. Example inputs may include identification of which logical entities within the source site 200 are to be replicated and/or recovered, which entities are available on the target site 300, and related parameters.

The operation of each component in FIG. 1 is explained in more detail below. In general, these components provide an abstraction layer on top of identified common tasks in an end to end replication-recovery flow. They may or may not implement the actual execution required to carry out the replication-recovery. Given the complex nature of the Disaster Recovery (DR) and the required replication processes for the same, it is common for these components to call into a corresponding vendor-specific tool present into the environment. For example, a certain Discovery Component 220 may call into a VMWare discovery API, or it may call into an OpenStack Resources API, after determining whether the underlying infrastructure in the source site 200 is VMWare or OpenStack based. In another example, a Deployment Component 340 on the target site 300 may call into a CloudFormationTemplate if the recovery site uses Amazon Web Services.

All of these components are thus "vendor-neutral" in the sense that they have intelligence to call into the appropriate vendor-specific tool based on a request made through the interface(s) 250 and/or 350, optionally taking into consideration such things as Service Level Agreement (SLAs) chosen to optimize Recovery Point Objective/Recovery Time Objectives.

b) Unified Replication and Recovery Protocol

The Unified Replication and Recovery Protocol (also referred to as the protocol herein) defines a process, protocol data units, and the integration of the replication and recovery engine components. FIG. 2A is a flow diagram of one example implementation.

In general, the protocol may begin at start point 280 and first perform discovery of data and metadata using the discovery component(s) 220 and/or deployment components (240) (FIG. 1). Discovered units 221 are then fed to replication component(s) 230 where they are converted to Replication Data Units 255. Replication Data Units 255 are then output over the transport mechanism 270 (via Replication Component(s) 230, 330) to a Recovery Component 370 associated with the target site 300. The Recovery Component 370 then perform de-conversion of the Replication Data Units into vendor-specific formats needed on the target site 300. The resulting deployment units 371 are then fed to deployment component(s) 340 on the target site 300 and the protocol ends at 372.

An example implementation of the protocol may proceed as follows:

1. The source site 200 is discovered by one or more Discovery Components 220, which may in turn invoke vendor specific (or non-vendor specific) tools to discover aspects of protected logical entities at the source site 200. Protected logical entities may include details of the IT infrastructure, platform(s), storage entit(ies), network(s) and the like, along with the details of resources to be protected including but not limited to virtual machines, storage and network artifacts.

2. Based on the result from step 1, the discovered specifics of the source site and its infrastructure details are used to identify the required set of tools (which comprise any vendor specific and/or non-vendor specific tools) needed to aid in the execution of the complete flow. These tools are then provisioned on the source site 200 using the deployment component(s) 240 in an automated fashion. The deployment component(s) may also have the intelligence of deciding a frequency of such deployment on source site. For example, deployment may be one time activity on some setups, or deployment may be a scheduled or recurring activity in other setups.

3. The Discovery Component 220 also generates the Discovered Units 221, for the set of resources to be protected. These Discovered Units 221 are then fed into the Replication Component 230, which converts these Data Units into one or more protocol data units, namely the Replication Data Units 255. Replication Data Units 255 contain sufficient information for the components on the target site 300 to perform replication and/or recovery, consisting of but not limited to various artifacts of the virtual machines, networks, storage, users, user groups, etc. to provide a unified and vendor neutral intermediate data format.

4. The Replication Component 230, in turn is also responsible for choosing the correct communication technology and/or transport mechanism 270 underneath it to transport the Replication Data Units 255 to the target site 300.

5. Analogous to steps 1 and 2, the chosen target site 300 is discovered by the Discovery Component(s) 330 and provisioned as necessary by the Deployment Component(s) 340. One of the responsibilities of the Deployment Component(s) on the target site 300 is to deploy the necessary staging area, or storage, or any site specific data store to persist the incoming Replication Data Units 255.

6. The Recovery Component 360 on the target site 300 is then responsible for converting the persisted Replication Data Units 255 into Deployment Recovery Units 371. The time and trigger for such conversion may be dependent on the site specifics. For example, the Recovery Component 360 may choose to do such conversion before the actual recovery is triggered or may choose to persist the Replication Data Units 255 in persistent stores and do lazy conversion.

7. Another responsibility of the Recovery Component 360 is to process machine conversion based on the specifics of the target cloud. Based on the underlying technology the order of this conversion may be either before 'Replication Data Units (RDUs) 255 to Recovery Units (RUs) 271 transformation or afterwards. The Recovery Component 360, being aware of the environment of the recovery, applies required marshalling during the conversion and brings it in the recovery environment's 300 native format. (In one example, a Virtual Machine instance running in a VMware based protected environment that is protected to an Amazon Web Services (AWS) based target environment may be converted in the required AWS native image/machine format by the Recovery Component 360.) The Recovery Component 360 may call into the corresponding supported conversion toolset to achieve this function.

8. When actual recovery-replication is demanded (which may be based on specifications referred to as Recovery Executable Templates already provided by the user(s) 400 through the Recovery Planning Component 370), the Deployment Component 340 then takes in the Recovery Units provided in Step 6 by the Recovery Component 360 and initiates orchestration of the final set of required artifacts on the target site 300. This then enables the complete recovery of the protected resources on the target site.

c) Protocol Data Units

In a complex system such as the one described herein, there may be many forms of data exchanges needed between the various components. A call to an HTTP based API to obtain inputs from the users 400 is one type of data exchange. However, the Protocol Data Units referred here are also a fundamental part of the data which flows through the Components of the Unified Replication and Recovery Protocol mentioned above.

There are two such types of Protocol Data Units, Replication Data Units 255 and Recovery Units 371.

1. Replication Data Unit 255. This first type includes a common and abstract data encapsulation which is formed by marshalling artifacts of the protected resources. These artifacts may include things such as Virtual Machine (VM) identifiers (IDs), network parameters, storage associations, and/or application states along with the actual disk data to be protected. The conversion of discovered protected resources to such Replication Data Units may depend on the platform(s) and related specifications for the source 200 and target 300 sites. Irrespective of the vendor or any other tooling used underneath, these abstracted set(s) of Replication Data Units are determined from the outputs of the discovery of protected resources. Example of such Replication Data Units could be protection of a complete single application which may in turn generate multiple such Replication Data Units which cover the VM and network level artifacts, and slices of actual data of the disks to be replicated.

An example Replication Data Unit (RDU) may include a header, metadata, and/or data changed block.

i. Header: This could include timestamps, replication settings, replication group identifiers, RDU ordering information and any other data pertaining to that particular replication job.

ii. Metadata: This may include addition/removal/update of protected resources on the source site. e.g. VM addition, VM removal, disk addition, disk removal. It also captures changes to any of the related infrastructure resources i.e. network addition, Classless Interdomain Routing (CIDR) changes, network removal, Network Interface (NIC) addition/removal. Based on the environment it may also add changes in the Identity and Access Management (IAM) related actions e.g. user or role addition/removal/update etc.

iii. Data changed blocks: Any of the changed data blocks of the protected resources may be sent through the RDUs. Each RDU may have a timestamp in the header for the interval in which this change has happened. This timestamp is related to the frequency chosen by the software for the replication. For example, if the replication happens every 'n' minutes, then if the replication has happened at time t(i), the RDU would early the changed data blocks for times (t(i+n)–t(i)) for the scheduled replication which would also carry the schedule details in the header. During the initial seeding of the virtual machines where a large amount of data needs to be copies to the target site, the replication may not be periodic and it could be continuous; such timestamps are irrelevant in that phase. For the replication technologies implementing continuous replication only the current timestamp would be recorded when the RDU is dispatched.

Figure 2:
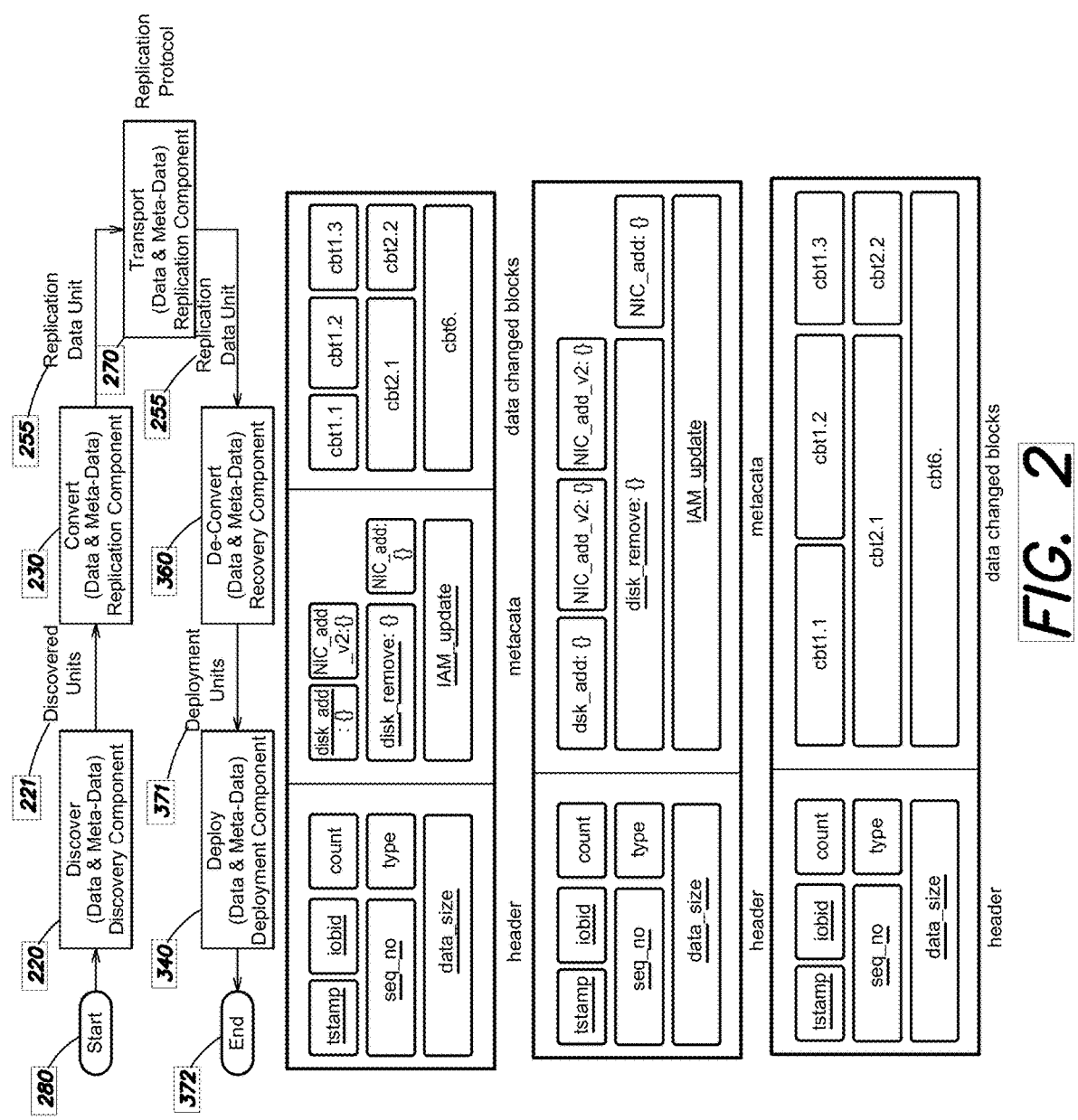
FIG. 2 is a high-level diagram of a unified replication and recovery protocol with examples of Replication Data Units (RDUs).

FIG. 2 also shows an example initial seeding RDU.

FIG. 2 also shows an example RDU with combined change during replication.

FIG. 2 also shows an example RDU having only a metadata change.

2. Recovery Unit 371. This second type is a common and abstract data de-encapsulation which results by un-marshalling the Replication Data Units on the recovery site 300. The Deployment Recovery Unit(s) 371 typically cannot be directly mapped from the Replication Data Unit(s) 255 on the source site 200 as the mapping is dependent on the configuration of the target site 300. The Recovery Component 360 on the target site 300 maintains the required algorithm to generate the mapping.

The solution described herein thus provides an end-to-end framework for automating replication and/r recovery of protected logical entities in a way that no other solution provides. These frameworks support a variety of vendor-specific recovery and replication solutions by adding and/or writing new plug-ins that implement integration with existing vendor tools, which are then called by the respective replication and recovery components. The intelligent replication and recovery engine components can then choose a replication solution depending upon the customer needs; automate deployment of agents, virtual machines, and other related components which in turn reduces the overall cost of implementation.

The different components of the replication and recovery engine are now described in more detail.

1. Discovery Components

The Discovery Component(s) 220, 320 are responsible for discovering various resources in the IT infrastructure that comprise both the source site 200 and target site 300. A Discovery Component is focused on unifying a generic protocol for discovering aspects of the protected resources on the source site 200, while assisting Disaster Recovery to set up equivalent infrastructure for business continuity on the target site 300. They discover IT resources irrespective of any vendor-specific discovery tool being used. They operate at various levels of resources, such as infrastructure, platform, application and data and metadata. The discovery component(s) 220, 320 can also discover required properties and metadata of these resources.

Figure 3B:
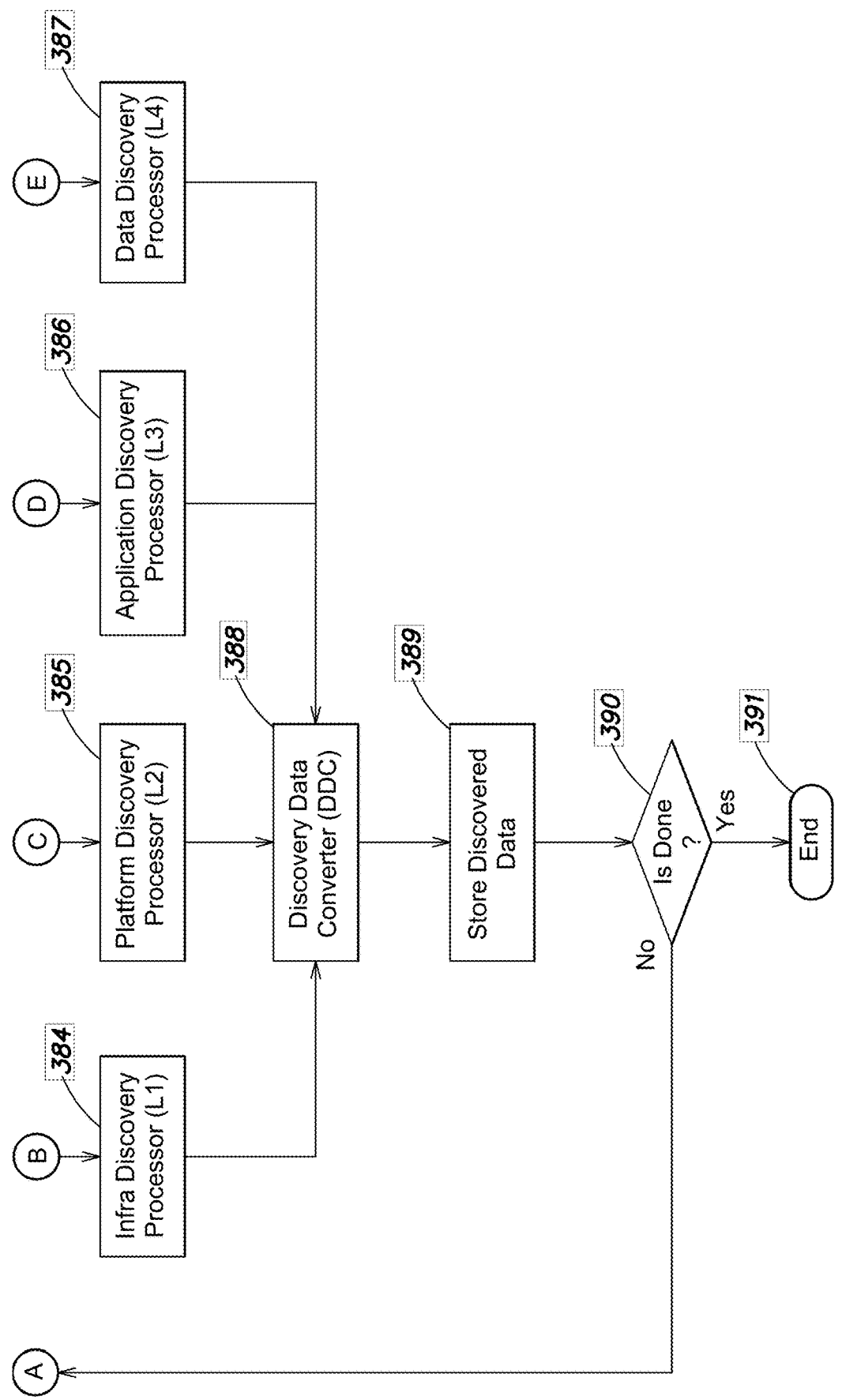
Figure 4:
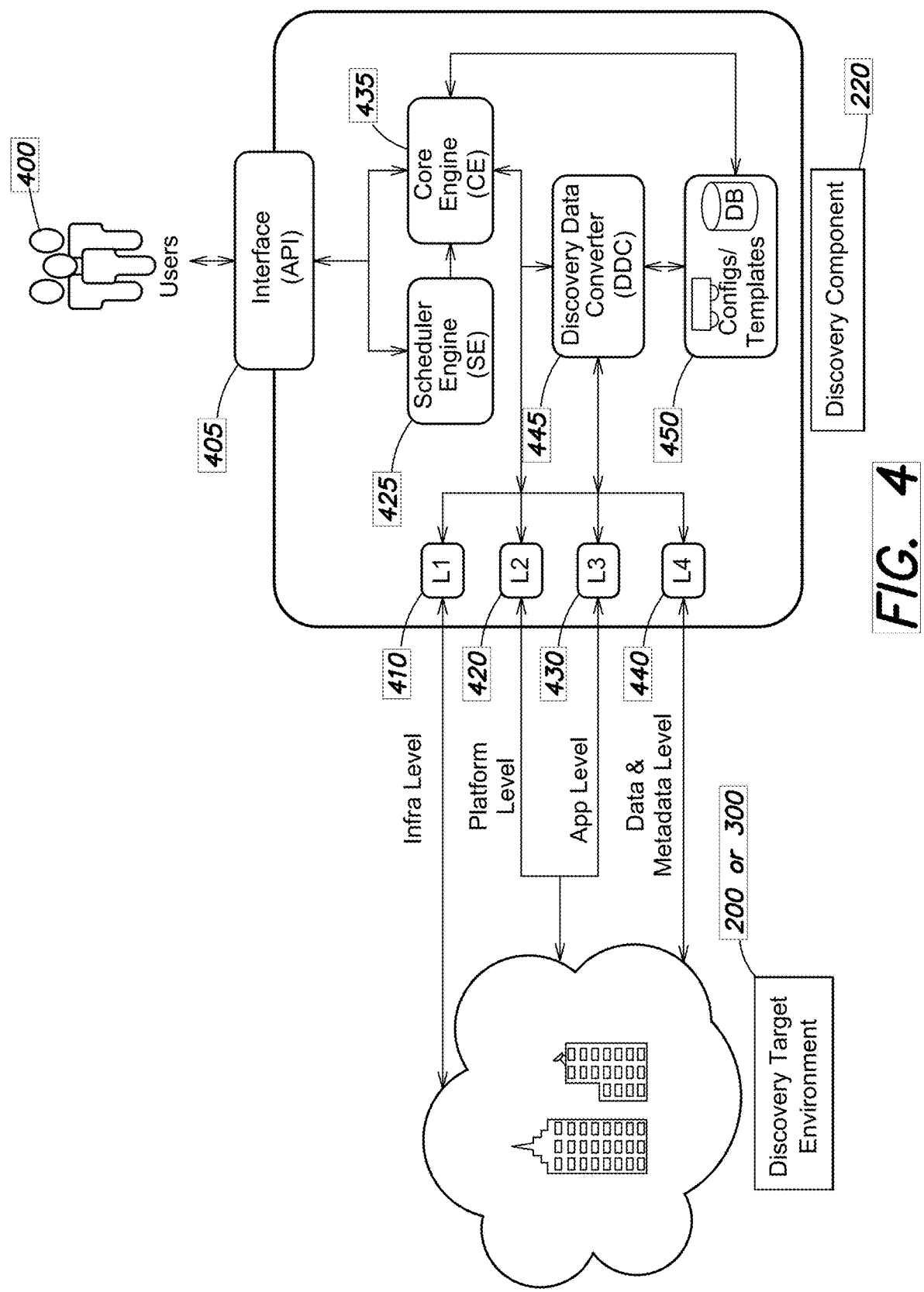
FIG. 4 is a diagram of a discovery component.

FIGS. 3A and 3B are a discovery process flow diagram and FIG. 4 shows the configuration of a Discovery Component in more detail. Referring first to FIG. 4, an example discovery component 220, 320 consists of various discovery processor(s) and/or tools aimed at different levels of protected IT resources, including an infrastructure level tool (L1) 410, a platform level tool (L2) 420, an application level tool (L3) 430, and a data and metadata tool (L4) 440. These various processors help the Discovery Data Converter 440 to consolidate the discovered infrastructure information needed for replication and recovery. These processors/tools process the discovered IT resources irrespective of any needed vendor-specific discovery tool.

An example Infrastructure Level (L1) Processor 410 processes and consolidates the discovered physical infrastructure.

An example Platform Level (L2) Processor 420 processes and consolidates discovered cloud platform resources.

An example Application Level (L3) Processor 430 processes and consolidates the properties and information of hosted applications in the cloud platform resources.

An example Data and Metadata Level (L4) Processor 440 processes and consolidates the protected resources discovered underneath storage and metadata resources. Metadata may include attributes such as user roles, or other data that refers to any of the other three discovery levels (L1, L2, and/or L3) singly or in combination.

The Scheduler Engine (SE) 420 allows scheduling the discovery of given IT resources at one or more scheduled times, which may be a one time occurrence or which may be scheduled as periodic discovery of resources/infrastructure, so that any changes made to infrastructure will be eventually discovered.

The Core Engine (CE) 430 is responsible for processing and filtering the discovered resources/infrastructure for replication and recovery.

The Discovery Data Converter (DDC) 440 converts the Discovered resources' properties and data into unified data models. The unified data models are then used during the recovery.

Referring to the process flow diagram of FIGS. 3A and 3B in more detail, a discovery component 220 and/or 230 basically starts with very low level discovery of for example the IT infrastructure and then proceeds to perform platform and application level discovery, and on to metadata discovery.

The discovery process flow starts at state 375 and then proceeds to receive discovery data input at state 376. This input is typically received from users through the respective interface 250 and/or 350 but can also be received from other components. For example this discovery input may specify the type of data to be discovered such as for example an identification of the protected resources at the source site 200 target site 300. This input data is then processed by the core business logic to allow decision branches and the rest of the discovery process to be executed.

In the next state 377 a determination is made as to whether or not the discovery is on demand or scheduled. This state may be under control of the scheduler engine 420. If discovery is scheduled then state 378 schedules the rest of the process, otherwise in state 379 the process remains dormant until the scheduled time is reached.

In any event state 380 is eventually reached where the core engine performs core engine 430 performs the fundamental discovery logic. For example in state 381 if infrastructure discovery is specified by the data discovery input, the infrastructure discovery processor 410 (L1) is invoked in state 384. Similarly, if platform discovery in state 382 is requested then in state 385 the platform discovery processor (L2) is invoked. Likewise if application discovery is requested in state 383 then the application discovery processor (L3) is invoked in state 386. If necessary the data discovery processor (L4) is invoked in state 387.

The are then processed by the discovery data converter in state 388, and discovered data is then stored in state 389.

If all requested discovery levels have not yet been processed then processing returns to the core engine in state 380. Eventually the discovery process flow ends in state 391.

As mentioned previously, the various discovery tools in states 384 through 387 are invoked in a vendor-neutral way, but the various blocks ultimately call into respective vendor-specific tools to obtain the discovered data.

In one example, the infrastructure discovery processor 410 (L1) accessed in state 381 discovers data concerning infrastructure elements such as compute, storage and network resources. The vendors who provide those resources used in the sites 200, 300 may each use different discovery tools. For example, if a compute resource is a Virtual Machine, then the infrastructure discovery processor 410 will first determine whether the source site 200 implements VMWare or OpenStack. If its VMWWare, then a VMware specific discovery tool is called into; if it is an OpenStack implementation, then an OpenStack discovery tool is called. The target site may use a different VM solution, such as Amazon Web Services.

The platform discovery processor 420 (L2) operated in state 385 is concerned with discovery of various IT platforms, which may, for example, be a database platform, or a software development platform, or an operating systems (OS).

The application discovery processor 430 operated in state 386 discovers applications that may be sitting on top of the infrastructure element(s) or the platform(s). An example application may be Oracle database, or SalesForce.

Finally, the data discovery processor 440 operated in state 387 may be tasked with determining user workgroups, or relationships between applications. For example, a protected e-commerce resource may include a transaction server that in turn depends on a certain web server cluster and three different databases). These various data and metadata structures related to the protected logical entity also need to be transported at the time of recovery.

2. Deployment Components

The Deployment Component(s) 240, 340, are focused on the automation and deployment of infrastructure, platform, resource, and agents in virtual machines which are essential for the replication and recovery of discovered platforms. Deployment plugins may include corresponding infrastructure, platform, resource, and agent installation plugins that assist a core deployment engine. The associated protocol helps to recover replicated resources on the target environment 300.

Figure 5A:
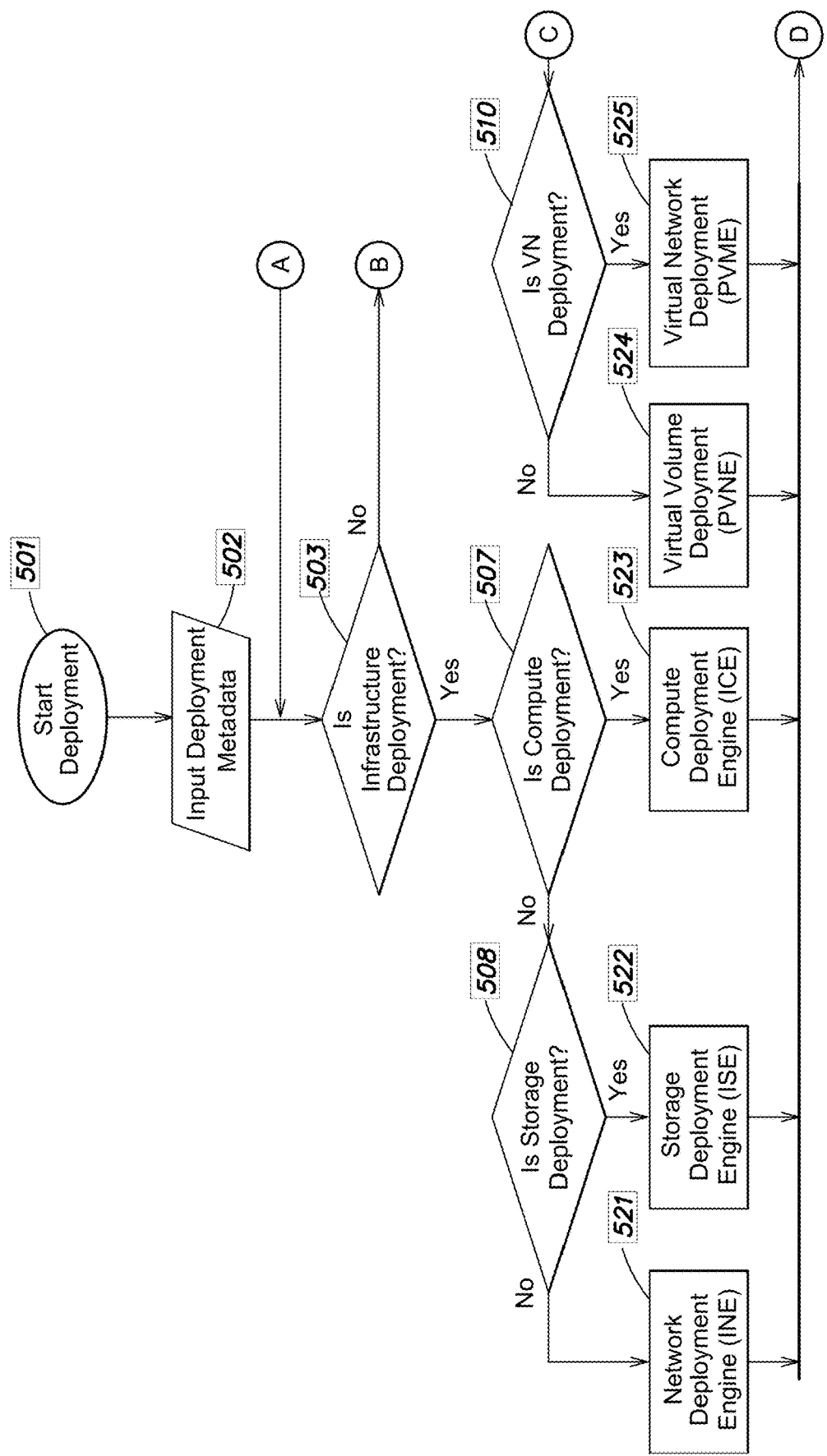
FIGS. 5A and 5B are a flow diagram for a deployment component.
Figure 5B:
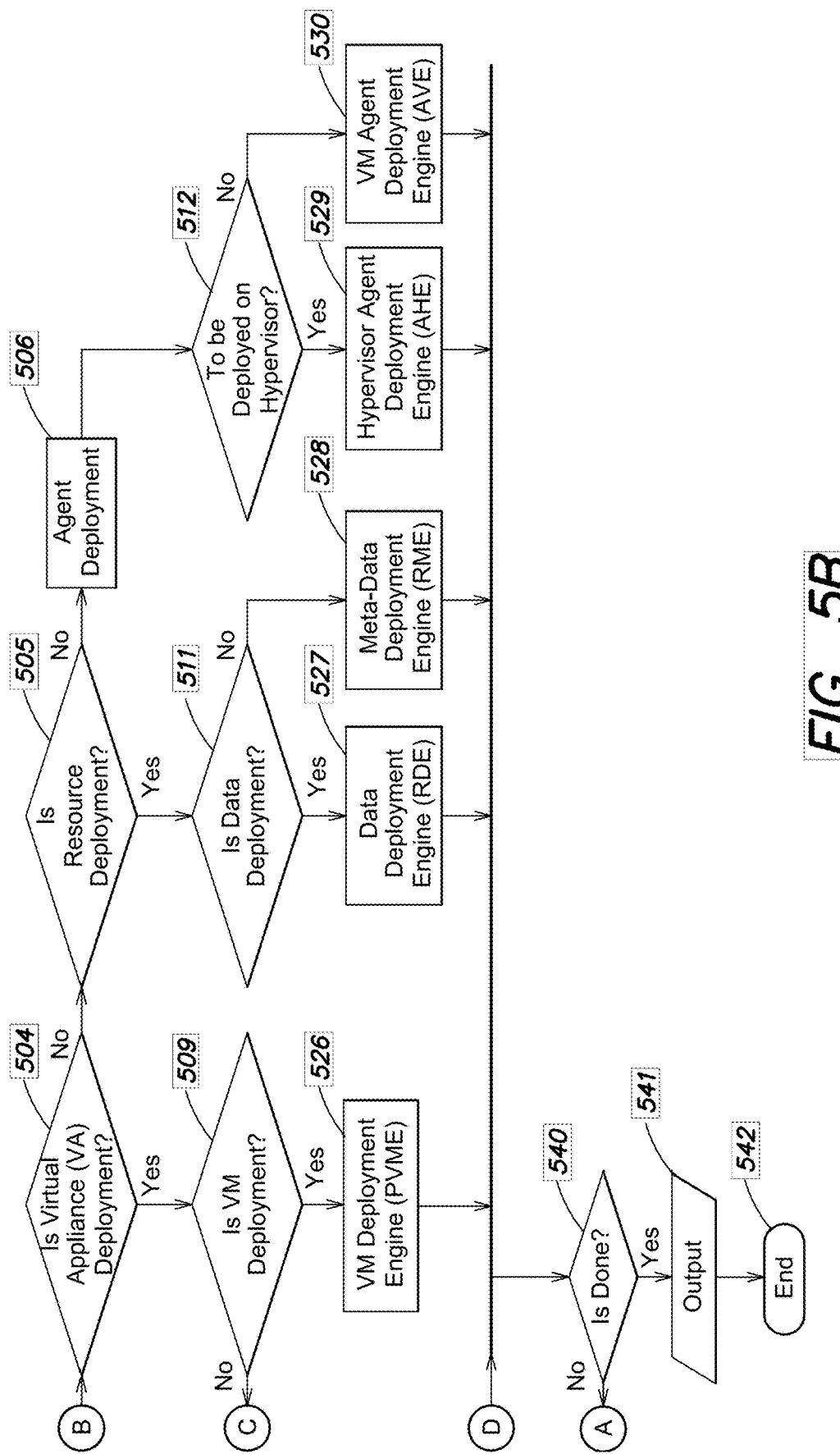
Figure 6:
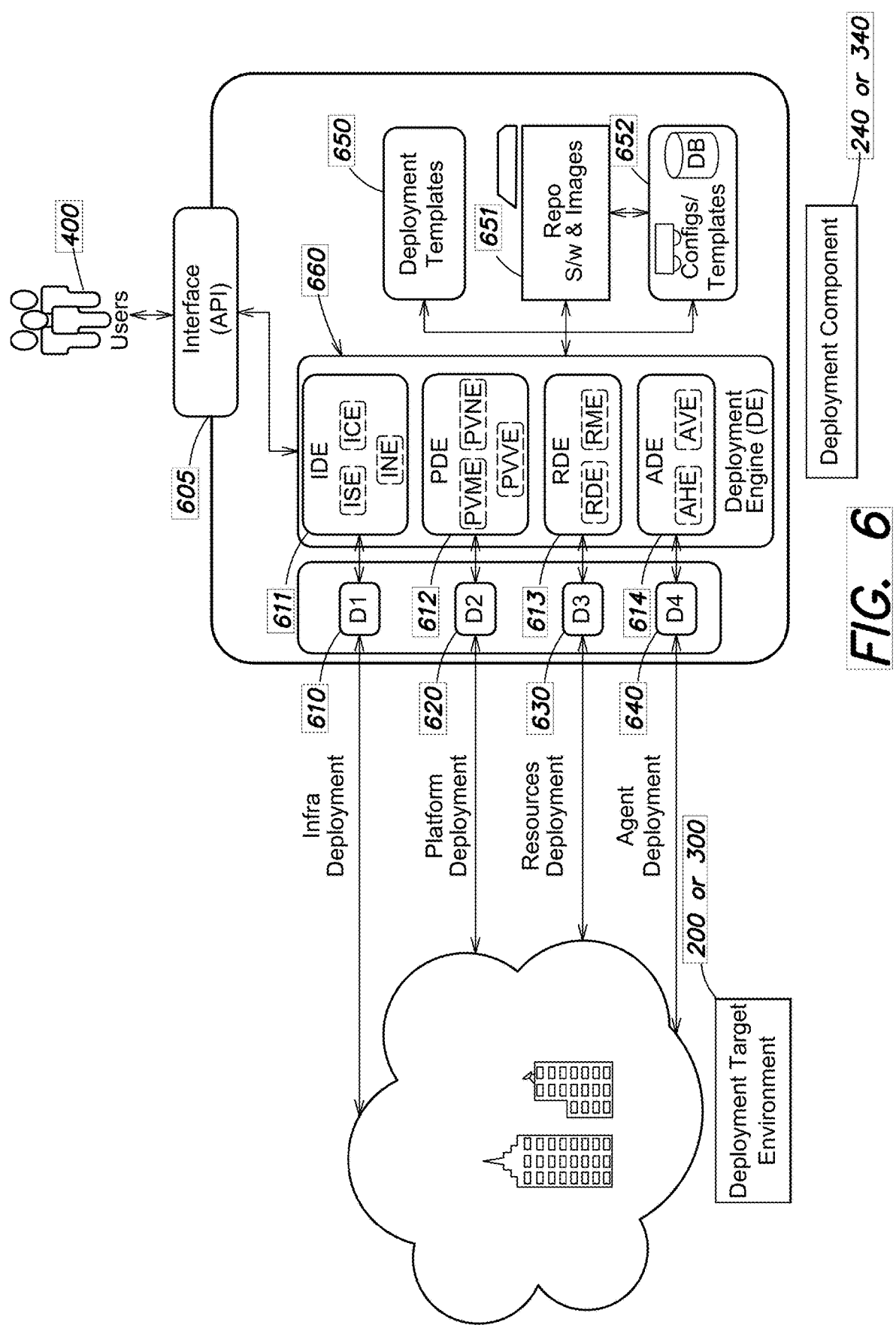
FIG. 6 is a high level diagram of the deployment component

FIGS. 5A and 5B are a detailed flow diagram for a deployment process 240, 340 and FIG. 6 a diagram of the corresponding subcomponents. As shown in FIG. 6, a Deployment Component 240, 340 mainly consists of various Deployment Plugins/Interfaces (D1), (D2), (D3) and (D4), corresponding respectively to an Infrastructure Deployment plugin 610, Platform Deployment Plugin 620, Resource Deployment Plugin 630 and Agent Deployment Plugin 640.

The Infrastructure Deployment plugin(s) 610 are a part of the core Deployment Engine 660 that deploys various types of infrastructure.

Platform Deployment plugin(s) 620 deploy platform specific resources such as storage, compute and network resources.

Resources Deployment Plugin(s) 630 deploy resources on cloud platform(s) such as users, roles, policies, workgroups, user virtual machines and the like.

Agent Deployment Plugin(s) 640 deploy agent(s) on virtual machines that can be required for agent based replication for recovery.

More particularly, the Infrastructure Deployment Engine (IDE) 611 is responsible for deploying infrastructure required for replication and recovery. This may consist of physical or virtual infrastructure such as storage, compute, or network. The deployment for required storage, compute and network is handled by an Infrastructure Storage Engine (ISE), Infrastructure Compute Engine (ICE), and Infrastructure Network Engine (INE).

The Platform Deployment Engine (PDE) 612 is responsible for deploying platform specific entities such as virtual appliance/machine, virtual networks, virtual volumes and the like. The deployment of these entities is handled by a Platform Virtual Appliance/Machine Engine (PVME), Platform Virtual Network Engine (PVNE), andPlatform Virtual Volume Engine (PVVE).

The Resource Deployment Engine (RDE) 613 is responsible for deploying the user resources on given target cloud platform such as users, groups, roles, policies, workplace/ workgroups, user virtual machines, etc. Deployment user data such as user virtual machines, user storage volumes and the metadata such as network configuration, profile creation of user is handled by a Resource Data Engine (RDE) and Resource Metadata Engine (RME). The RDE is also used for spinning up the discovered and replicated resources on target site.

The Agent Deployment Engine (ADE) 614 is responsible for deploying the agent(s) inside virtual machines or platform specific hypervisor(s) required for replication of data. The deployment of agent(s) onto hypervisor(s) and virtual machine(s) is handled by Agent Hypervisor Engine (AHE) and Agent Virtual Machine Engine (AVE).

Deployment Templates 650 may be infrastructure, platform, resource and agent deployment—specific templates. These templates may include instructions used by one or more of the Deployment Engine 660 subcomponents.

The Repository 651 may contain software, installers, images and the like that are needed to deploy on a specific OS or application.

The Configuration Database 652 is used by Deployment Engine 660 to record commonly required configuration and status of deployment and logs.

The Deployment Component(s) 240, 340 thus unify and define a protocol to deploy infrastructure, platform, user resources and agents for Replication and Recovery specific technologies.

The Deployment Components 240, 340 are enabled to deploy whatever resources are called for to protect the logical entity. Typically the first step on a source site is to deploy a vendor tool to perform the actual protection. Some vendor tools may require certain types of infrastructure for deploying them, such as a certain amount of storage, a certain type and amount of compute in the form of one or more VMs, and certain network configuration. Once the infrastructure is deployed, then associated software may be deployed on top of those, then some agents or the like on each of the VMs such as a hypervisor. After these basic stages, the Deployment Component may then capture data and metadata related to the protected resource(s). At a target site, where recovery and/or replication are carried out, the same or corresponding elements need to be deployed. For example, the target site may deploy corresponding but different types and numbers of virtual machines, virtual storage, and virtual networks.

It should be understood that the various Deployment Engines 611, 612, 613, 614 are structured with a common interface but then may call into corresponding vendor-specific tools. The engines typically also have interfaces implemented by each of the vendors. For example, a VMware tool may have its own version of a plug-in. In another instance where the implementation uses a third party replication tool set, the deployment component may invoke a discovery tool on the source site 200 and deploy an actual recovery tool on the target site 300.

Turning attention to FIGS. 5A and 5B, the process performed by the deployment component may start in state 501. Next, in state 502 it receives deployment metadata as inputs. The deployment metadata is then used to execute the remaining parts of the flow. In state 503, it is determined whether the requested deployment involves infrastructure. If so, then in state 507 if the infrastructure is a compute deployment, then state 523 invokes the compute deployment engine. In state 508, if the infrastructure deployment is storage then state 522 invokes the storage deployment engine. Similarly, state 521 deploys the network deployment engine if the infrastructure is storage. In state 504 if it is a virtual appliance deployment, and state 509 determines it is a virtual machine, then state 526 invokes the VM deployment engine. In state 510 if it is a virtual network deployment then state 525 invokes the virtual network deployment engine; likewise, if a virtual volume is implicated then state 524 invokes the virtual volume deployment engine.

In state 505 if it is a resource deployment is data related then state 511 invokes either the data deployment engine state 527 or metadata deployment engine state 528, depending on the requested resource. State 506 in turn invokes the requested agent from state 512, that being either the hypervisor agent deployment engine in state 529 or virtual machine agent deployment engine in state 530.

In any event the process iterates until all infrastructure, compute, resource, and agents are deployed. Eventually a state 541 is reached where the outputs are provided via the interface to the users and the process ends in state 524.

3. Replication Components

The Replication Components 230, 330 are responsible for replication of various resources from the source to target site. Replication Components 230, 330 permit adhering to any replication technology the users 400 choose as per their business needs. Replication Components 230, 330 may support different levels and types of Replication Units, to provide a unified solution by defining a protocol for Storage, Platform, Metadata and Application Replication. The Replication Components unify a generic protocol for the replication of IT resources, data and metadata irrespective of the different vendor's replication technologies used as per the business needs.

Figure 7A:
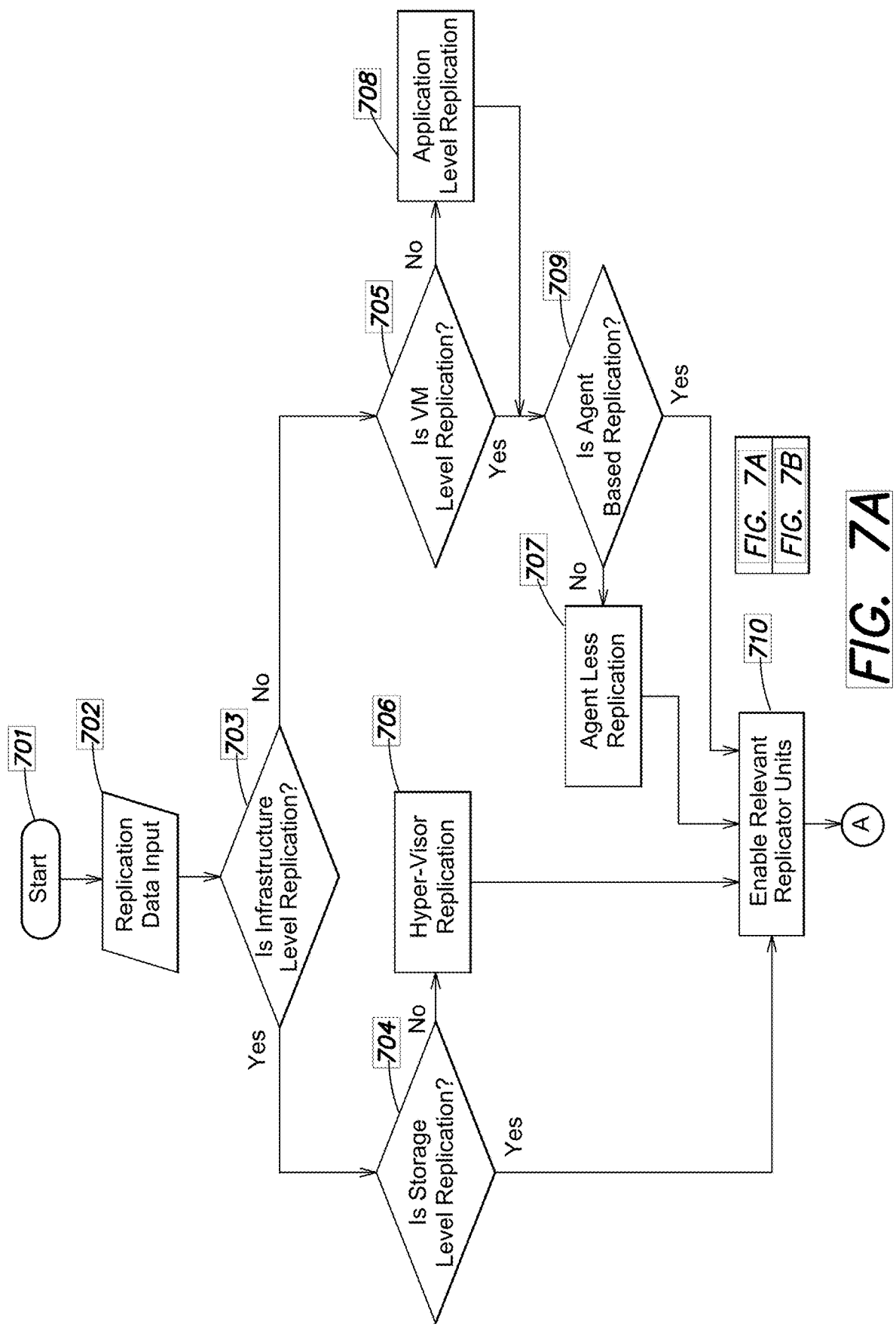
FIGS. 7A and 7B are a replication flow diagram.
Figure 7B:
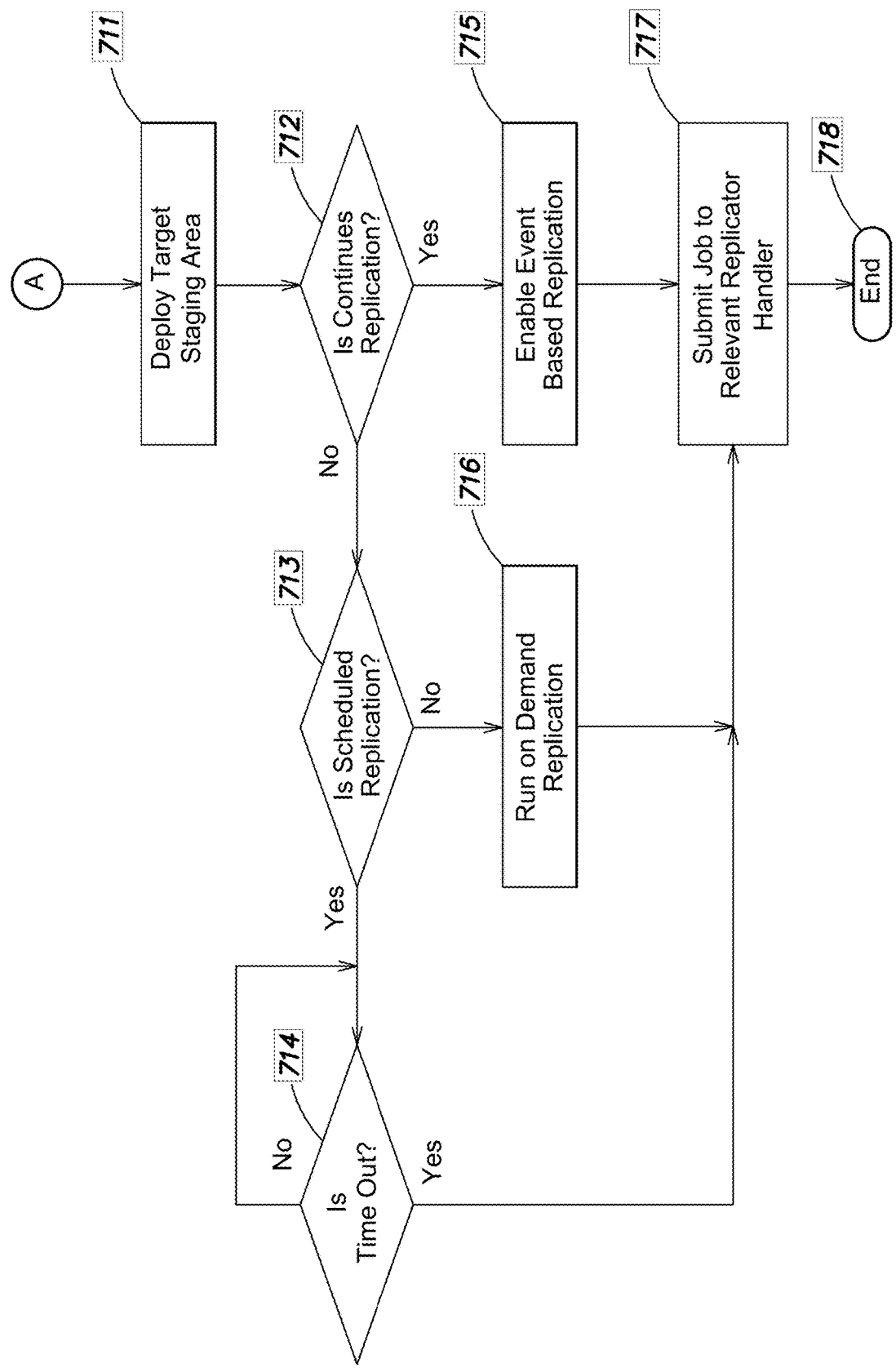
Figure 8:
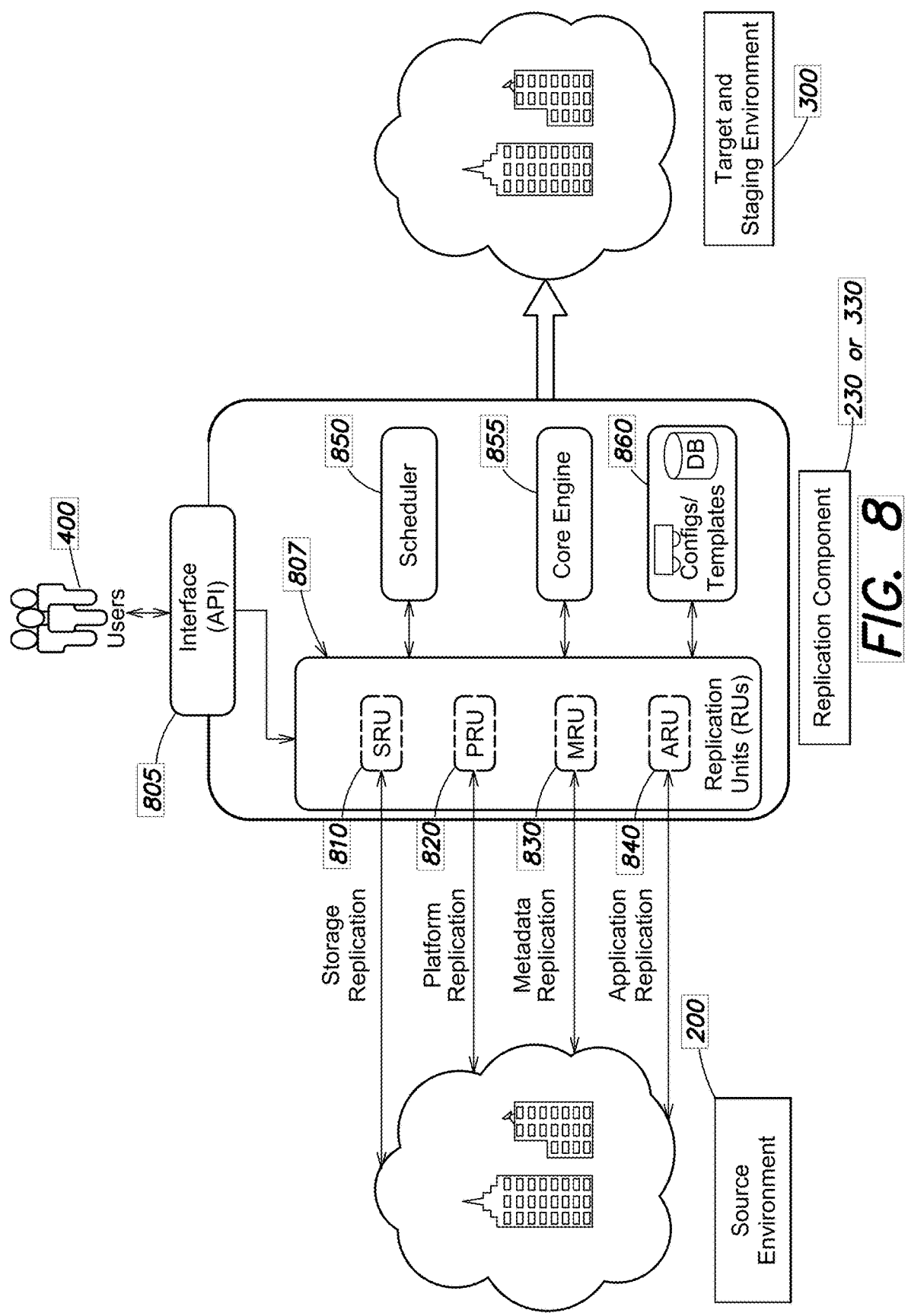
FIG. 8 illustrates a replication component.

A process flow for Replication Components 230, 330 is shown in FIGS. 7A and 7B and the underlying sub-components in FIG. 8. A Replication Component 230, 330 primarily consist of Replication Units (RUs) 807, Scheduler 850, Core Engine 855, Configuration/Template Database 860, and user interface(s) 805.

The Replication Units 807 are the core engines handling the different types of replication needed per the replication mechanism specified. In this embodiment, Storage, Platform, Metadata and Application replication may be handled by corresponding a Storage Replicator Unit (SRU) 810, Platform Replicator Unit PRU) 820, Metadata Replicator Unit (MRU) 830 and Application Replicator Unit (ARU) 840. Based on the underlying replication technology being used as per business needs these replicator units are enabled at the source 200 and their core replication functions are performed in the target.

The Scheduler 850 permits the framework enable either continuous or scheduled replication.

The Core Engine (CE) 855 is a core process of the Replication Component, acting as transformer and processor for the replication-discovered resources, data and metadata.

There may be different levels of replication supported. For example, at one level, the source environment 200 may use storage vendors that implement their own replication schemes. At another level, there may be processor replication schemes in place such as VMware Site Recovery Manager (SRM) on the target site 300. Still other installations may implement OS level replication which leverages agents sitting inside customer VMs to perform the actual replication. Thus, based on the input data, the Replication Components 230, 330 find and enable the appropriate vendor tool set, and then and then deploy the solution-specific and vendor-specific and/or deployment tool to orchestrate the replication and/or recovery.

It is possible to have two or more replication types within each level. Taking as one example storage level replication, the vendor replication tool may only replicate raw discs. Thus, some other tools are needed to replicate storage volumes, VMs or virtual networks. The Replication Component is aware of these constructs because they have previously been determined by the Discovery Component 220, 320.

As one can now appreciate, the various components in the Unified Replication so and Recovery framework, including the Discovery Component 220, 320, Deployment Component 240, 340, Replication Component 230, 330 operate independently but still make use of data and metadata communicated among them. For example, the replication component 230, 330 may need input from the discovery components 220, 320 and/or deployment components 240, 340 depending upon what kind of replication vendor is being used. In another example, a Replication Component 230 on the source site 200 may feed a Deployment Component 340 to ensure that the appropriate resources are available on the target site 300.

FIGS. 7A and 7B illustrate an example process flow for the Replication Component. From a start state 701 replication data input is received in state 702. Execution flow through states 703 to 709 determine whether the replication is infrastructure level, storage level, hypervisor level, VM level, application level and whether or not the replication is agent or agent less. State 710 then enables the relevant replicator units as needed. Once these replicator units are enabled, then state 711 can deploy a target staging area. Depending upon whether the replication is continuous or scheduled, states 712, 713 714 then end up running an on demand replication processing state 716 or enable an event-based replication process in state 715. One or more jobs are then submitted to the relevant replicator handler in state 717, and the replication flow may end eventually in state 718.

4. Recovery Component

The Recovery Component 360 is responsible for recovery of various resources within the Disaster Recovery Framework. It is focused on actual and test recovery of protected resources on a target 300 cloud platform, to provide business continuity when a disaster happens. This component also allows users to perform a test of the recovery periodically, to ensure that the resources are actually protected.

The Recovery Component 360 thus also assists with unifying the generic recovery protocol irrespective of any recovery technology utilized for recovering the replicated resources on the target 300.

The Recovery Component 360 uses a Recovery Planning protocol to translate a high level recovery plan into underlying recovery actions on target infrastructure. This component may cooperate with the Discovery Component(s) and Deployment Component(s), using the associated Discovery Protocol to discover the target cloud platform, and Deployment Protocol to check the availability of appropriate resources on the target cloud platform.

Figure 9B:
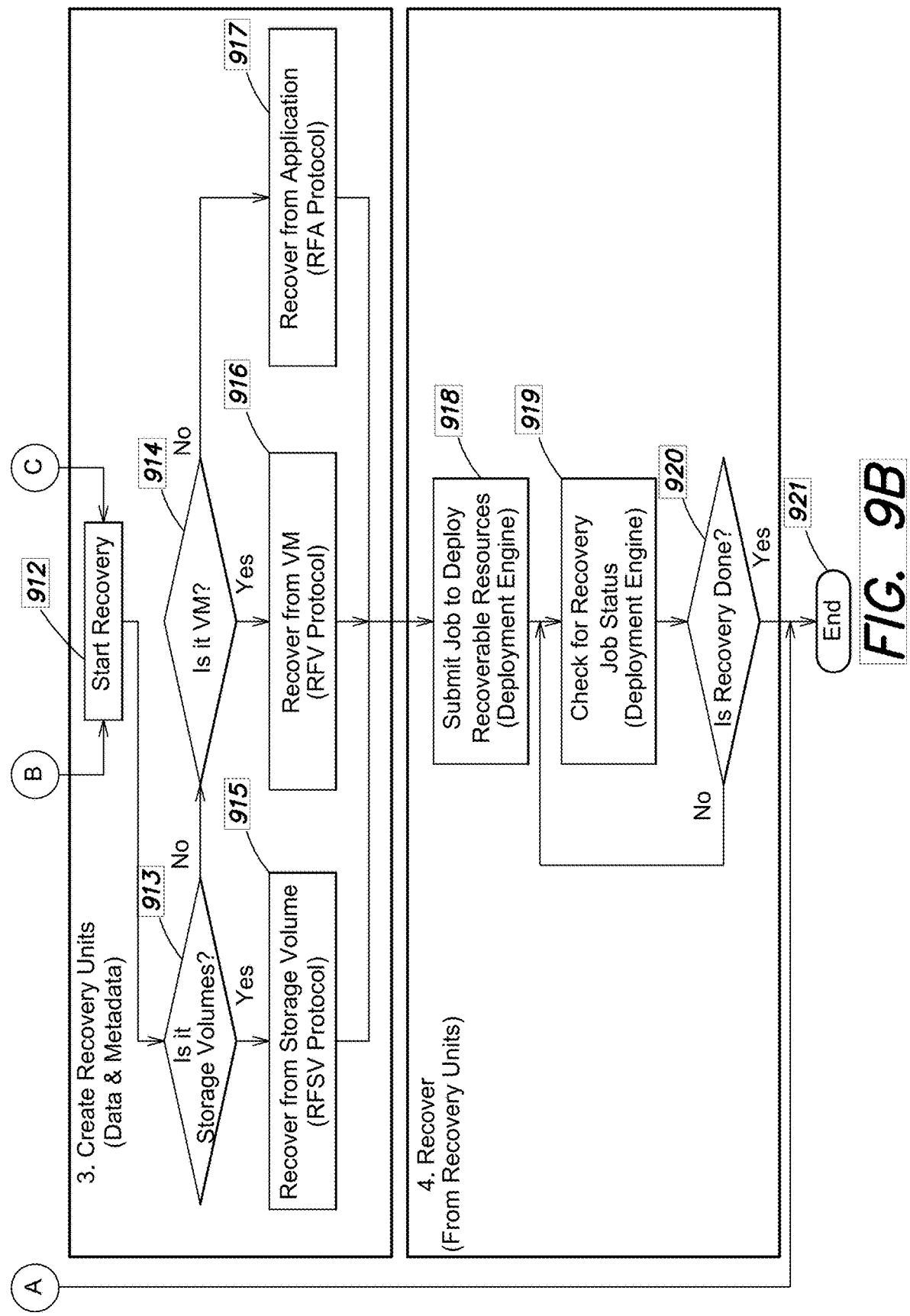
Figure 10:
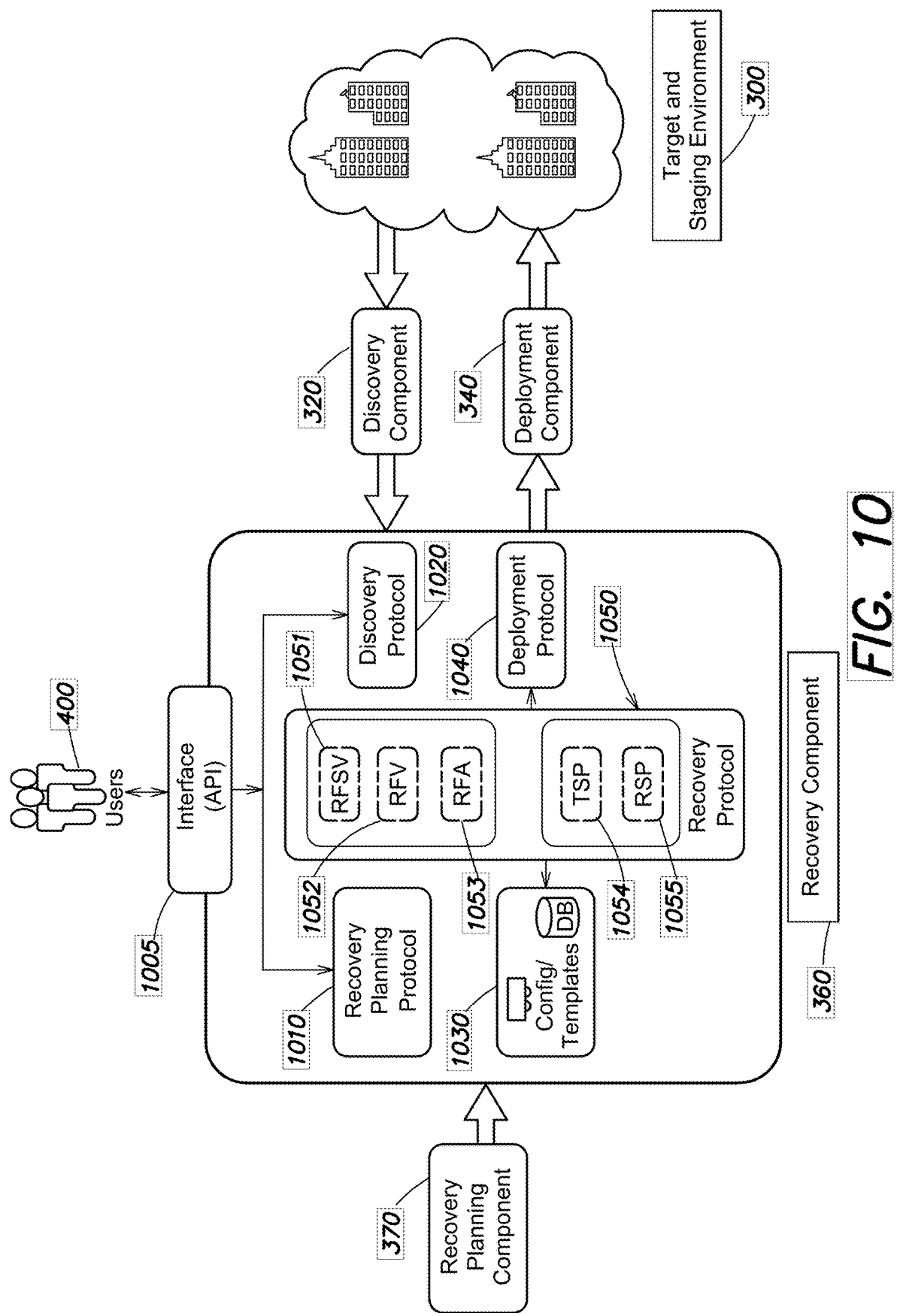
FIG. 10 illustrates recovery planning component.

FIGS. 9A and 9B are a flow diagram illustrating the overall recovery process at very high level and FIG. 10 illustrates a Recovery Component in more detail.

The Recovery Component 360 mainly consists of a Recovery Protocol 1050, but also leverages Recovery Planning Protocol 1010, Discovery Protocol 1020, Deployment Protocol 1040, Interface(s) 1005, and Configuration/Template Database(s) 1030.

Based on the type of replicated data available on the target environment 300, the Recovery Protocol 1050 defines a set of rules to process the replicated data and spin up those resources into target cloud platform(s). There may be five sets of rules in an example Recovery Protocol, including:

Recover from storage volumes (RFSV) 1051. This protocol is used for recovering resources from storage volumes on the target cloud platform.

Recover from Virtual Machines (RFV) 1052. This protocol recovers user machines which are replicated with an agent based replicated solution.

Recover from Applications (RFA) 1053. This protocol is used to recover the replicated applications and its data on target cloud platform.

Test Setup Protocol (TSP) 1054. This protocol is used to create a test setup on the target site when a user requests to test recovery on the target cloud platform.

Recovery Setup Protocol (RSP) 1055. This protocol is used to create an actual required setup for recovery of IT resources on the target cloud platform.

Recovery Planning Protocol (RPP) 1010. The recovery component uses the Recovery Planning Protocol to translate a user-defined, high level recovery plan into a platform specific plan to execute recovery.

Discovery Protocol 1020. The Recovery Component also uses the discovery protocol to discover the target cloud platform, for example, to check the availability of enough resources such as storage, compute capacity, etc. This helps to define the plan for resources that need to be recovered on a target cloud platform. This may be implemented using the Discovery Component 320 already described above.

Deployment Protocol 1040: The Recovery Component uses the Deployment Components to deploy replicated resources on target cloud platform. This may be implemented using the Deployment Component 340 already described above.

FIGS. 9A and 9B are an example recovery process flow. From the start state 901 input recovery data is obtained in state 902. In a first phase, platform and resources are discovered. State 903 for example may request discovery for target platforms and resources. Next, in phase 2, recovery set up test and/or set up actual processing is performed. Thus in a next state 904 a check is performed for the availability of necessary resources. If the necessary resources are not available then state 921 is reached, otherwise in state 905 it is determined whether the request is for a test recovery or actual recovery.

In the instance of an actual recovery then states 906, 907, and 908 are performed to prepare actual recovery set up, to deploy the actual recovery set up which may involve using the deployment engine, and then determining whether the actual recovery set up is complete. In an instance where a test recovery is requested, analogous steps are performed in states 909, 910 and 911 to prepare the test recovery, deploy the test recovery set up, and then to determine whether the test recovery setup is complete.

The two branches here are necessary because it is possible that the test environment may actually be different from the recovery environment. For example in one implementation a test environment may use a mobile network where the actual recovery may use hard wired networks. A test environment may also make use of smaller compute footprints for certain resources such as virtual machines. For example a recovery environment may require a large virtual machine (16 GB of RAM) but the e test environment may only require a machine with 2 GB of RAM. Thus the attributes of the components necessary to implement tests and actual recovery may differ.

Phase 3 is entered the when setups are now in place. From state 912, where recovery is started, state 913 and 914 then determine whether it is a storage volume, virtual machine, or application to be recovered. Depending upon the results of those tests the appropriate protocols are invoked in state 915, 916, and/or 917. After creating the discovery units, state 918 is entered in which a job is submitted to deploy the recoverable resources using, the deployment engine. In state 919 a check is performed for recovery job status. Once the recovery is done in state 920 the recovery process flow can end in states 921.

5. Recovery Planning Component

Figure 11:
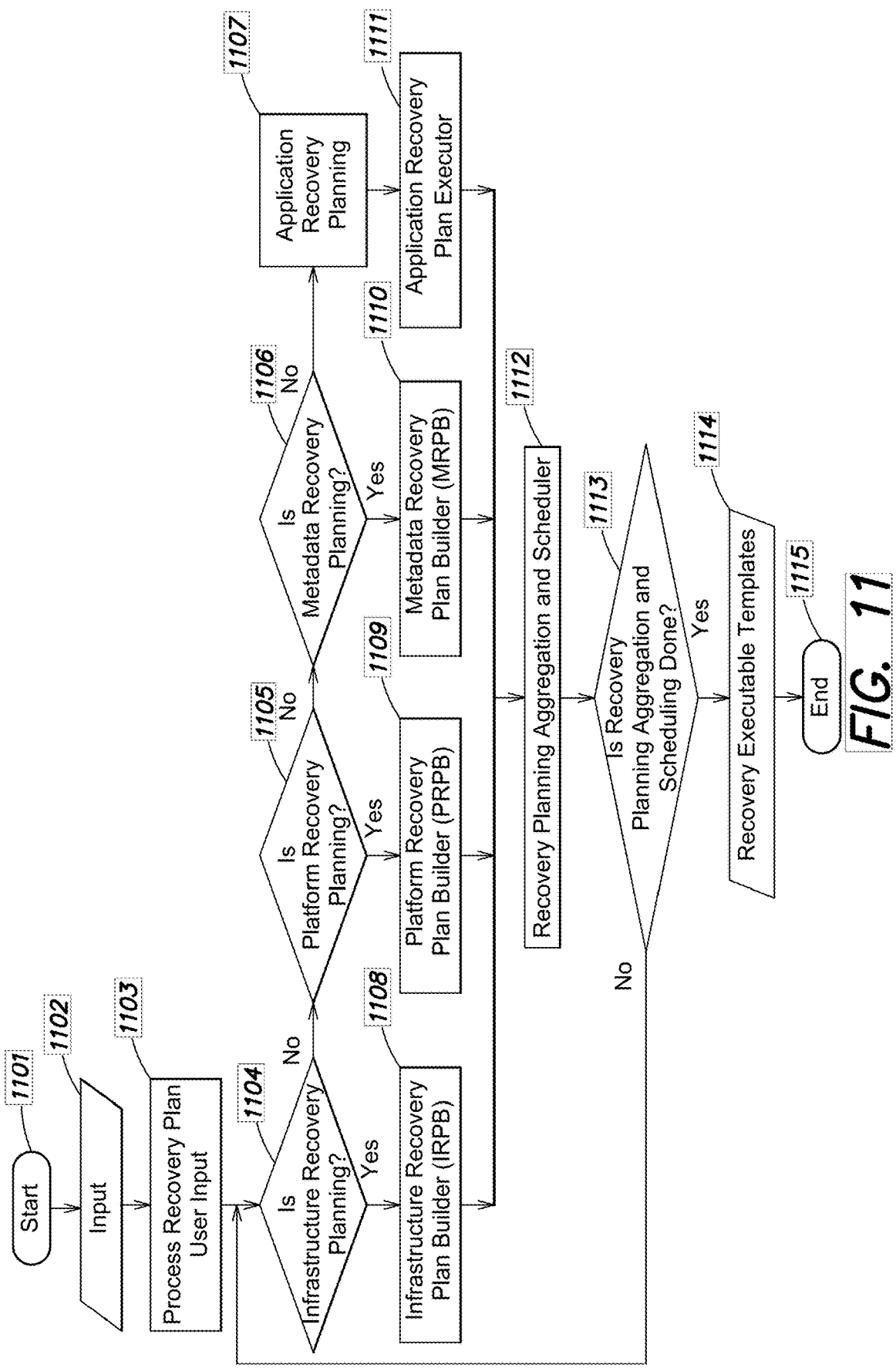
FIG. 11 is a recovery planning flow.
Figure 12:
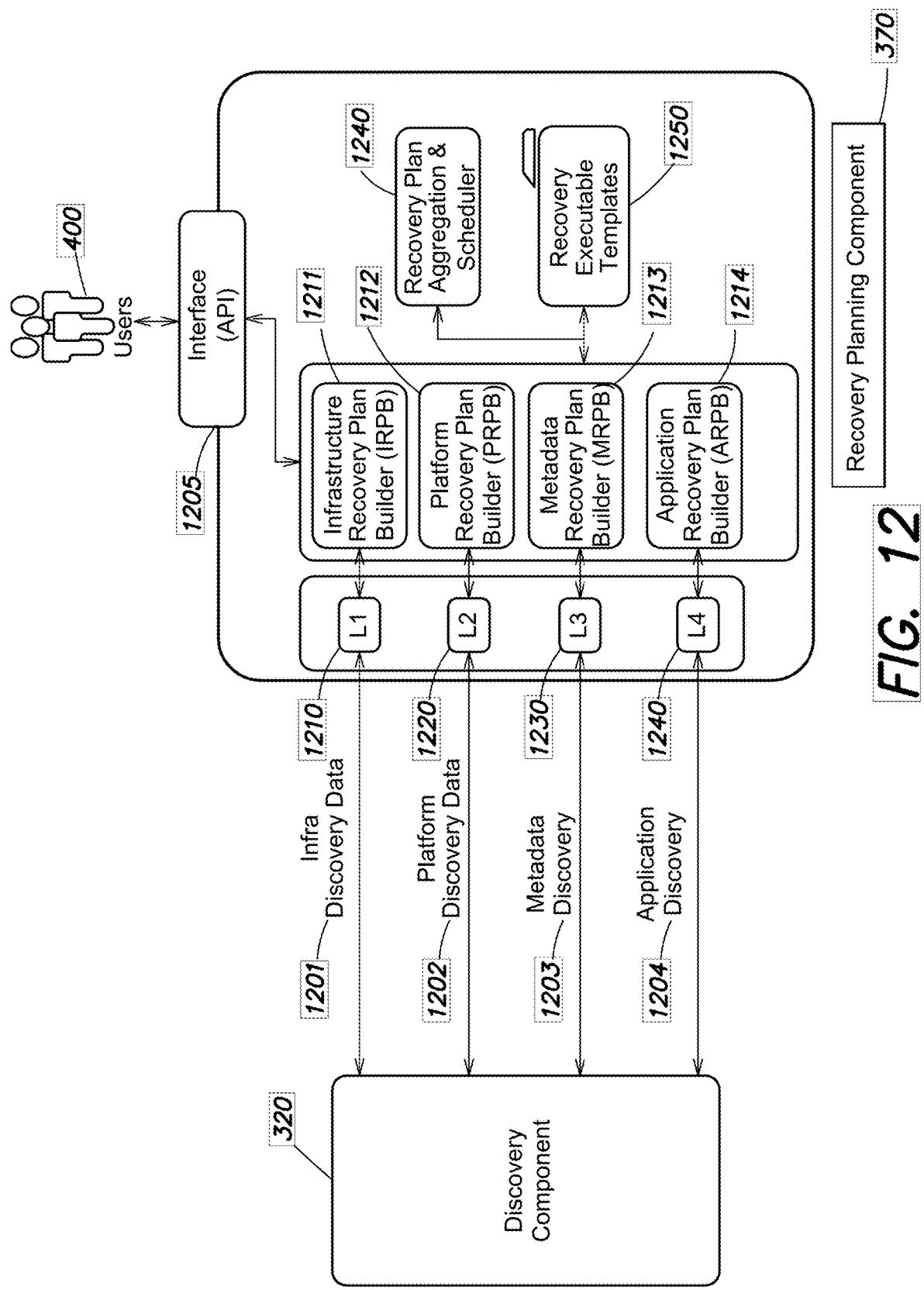
FIG. 12 is a diagram of the recovery planning component.

The Recovery Planning Component 370 is focused on unifying the recovery plan across different Recovery Planning Solutions for different platforms. FIG. 11 is a flow so diagram of its process and FIG. 12 illustrates its corresponding sub-components.

The Recovery Planning Component 370 accepts input from Users 400 via interface(s) 1205 as well information regarding the resources discovered using one or more discovery tools, such as Infrastructure Discovery Data 1201, Platform Discovery Data 1202, Metadata Discovery Data 1203 and Application Discovery Data 1204. The Recovery Plan Component also includes executors corresponding to each of level of discovered data. The Recovery Plan Component isolates the actual recovery plan from each level of discovered resources within the infrastructure and aggregates the overall plan into executable recovery plan templates.

The Recovery Planning Component 360 includes Discovery Level Interfaces (L1, L2, L3, L4) 1210, 1220, 1230, 1240. These interfaces collect data regarding the discovered resources from the corresponding discovery components. The discovered information can be Infrastructure, Platform, Metadata or Application—related discovery information.

Various Recovery Plan Builders (RPBs) process each level of discovered information. There are recovery plan builders for each level input and discovered resource type. The builders define the order of resource creation, inclusion and exclusion of resources based on the user input and the discovered data. In the example shown here, there are four RPBs, including:

Infrastructure Recovery Plan Builder (IRPB) 1211. This processes the input from user and the discovered infrastructure information, and builds the Recovery Plan Executable Template.

Platform Recovery Plan Builder (PRPB) 1212. This processes the input from user and the discovered platform information and builds the Recovery Plan Executable Template.

Metadata Recovery Plan Builder (MRPB) 1213. This processes the input from user and the discovered Metadata information and builds the Recovery Plan Executable Template.

Application Recovery Plan Builder (ARPB) 1214. This processes the input from user and the discovered application information and builds the Recovery Plan Executable Template.

A Recovery Plan Aggregation and Plan Scheduler (RPAS) 1240 aggregates the overall plan into single recovery plan executable template. That template is then used for recovery of IT resources as per the recovery plan defined by the Recovery Planning Component 360. This Executable Template may have an aggregated plan for the recovery which may include Infrastructure, Platform, Metadata and Application recovery plans for the overall datacenter as whole.

Recovery Plan Executable Templates 1250 are executable templates generated by the Recovery Planning Component 360 to trigger the actual recovery plan. These templates simplify the work necessary for the Recovery Component to recover actual IT resources on target cloud platform.

FIG. 11 shows the process for the recovery planning competent 360 in more detail. From an initial state 1101, input is received from the users and/or discovered components. The recovery plan input is then processed in state 1103. States 1104, 1105, 1106 and 1107 are entered depending upon whether the recovery planning is at the infrastructure, platform, metadata or application level. The appropriate recovery plan builder is then invoked in states corresponding states 1108, 1109, 1110 and 1111.

Once the recovery plan builders have been invoked the recovery planning aggregation and scheduler can then operate in state 1112. If the recovery planning aggregation and scheduling is not yet complete in state 1113 the process iterates. Eventually a state 1114 is reached where the recovery executable templates can be generated in the process may end state 1115.

The Recovery Planning Component 360 provides unified execution of recovery schemes across different levels of resource and different vendors. For example, a storage application vendor may provide its customers with tools that restore the storage volumes on the target site, and some of the orchestration around it. In the case of a hypervisor vendor, the vendor may provide orchestration around the Virtual Machine components that they support. However, if it is desired to replicate a complete workplace, additional levels of replication order are required. In one example, the source site 200 may support five applications. Three of the applications are considered very critical. Those critical applications need to be recovered first, and only then should the other two be recovered. It is thus also desirable from the user 400 perspective to specify such a recovery plan in a vendor-neutral way.

With this approach, if a protected resource changes at the source site 200, direct notification is received by the Replication Planning Component 360, such as via the Discovery Component 220. The Replication Planning Component 360 will then update its recovery plan accordingly. This is another advantage of the various Components communicating with one another.

The Recovery Planning Component 360 may be exposed to the users 400 through the interface 1205 so that they can view and/or alter the plan, while better appreciating how the end-to-end recovery process is implemented.

The foregoing description of example embodiments provides illustration and description of systems and methods for implementing Unified Replication and Recovery, but is not intended to be exhaustive or to limited to the precise form disclosed.

For example, it should be understood that the embodiments described above may be implemented in many different ways. In some instances, the various "data processing systems" described herein may each be implemented by a separate or shared physical or virtual general purpose computer having a central processor, memory, disk or other mass storage, communication interface(s), input/output (I/O) device(s), and other peripherals. The general purpose computer is transformed into the processors with improved functionality, and executes the processes described above to provide improved operations. The processors may operate, for example, by loading software instructions, and then executing the instructions to carry out the functions described.

As is known in the art, such a computer may contain a system bus, where a bus is a set of hardware lines used for data transfer among the components of a computer or processing system. The bus or busses are shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments of the components may therefore typically be implemented in hardware, firmware, software, or any combination thereof. In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing. By aggregating demand from multiple users in central locations, cloud computing environments can be built in data centers that use the best and newest technology, located in the sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. It further should be understood that certain implementations may dictate the block and network diagrams and the number of block and network diagrams illustrating the execution of the embodiments be implemented in a particular way.

Other modifications and variations are possible in light of the above teachings. For example, while a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, wetware, or a combination of hardware and software. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

Also, the term "user", as used herein, is intended to be broadly interpreted to include, for example, a computer or data processing system or a human user of a computer or data processing system, unless otherwise stated.

The foregoing description thus has been directed to specific embodiments of the present disclosure. It will thus be apparent, however, that other variations and modifications may be made to the described embodiments, with the attainment of some or all of their advantages. Therefore, it is the object of the appended claims to cover all such variations and modifications as come within the true spirit and scope of the disclosure and their equivalents.

What is claimed is:

1. A method for replication and/or recovery of protected resources located at a source site to a destination site comprising:
   at the source site,
      executing a vendor-neutral Discovery Component to identify one or more vendor-specific discovery tools for discovering aspects of the protected resources, including one or more aspects of infrastructure, platform, storage, network, or virtual machine protected resources;
      executing a Deployment Component, for deploying the one or more vendor-specific discovery tools on the source site according to a deployment schedule, to obtain data related to the protected resources;
      generating one or more Replication Data Units from the data related to the protected resources and/or user input, the Replication Data Units containing data representing artifacts of the protected resources in a vendor-neutral data format;
      forwarding the Replication Data Units to a transport mechanism;
   at the destination site,
      receiving the Replication Data Units from the transport mechanism;
      executing a Recovery Component for converting the Replication Data Units to vendor-specific Deployment Recovery Units; and
      executing a Deployment Component, using the vendor-specific Deployment Recovery Units to orchestrate a set of destination resources, thereby recovering the protected resources.

2. The method of claim 1 additionally comprising:
   at the destination site,
      executing a second Discovery Component to identify one or more vendor-specific discovery tools for discovering aspects of the destination resources, including one or more aspects of infrastructure, platform, storage, network, or virtual machine resources.

3. The method of claim 2 wherein the Deployment Component is further for:
   deploying storage for the Replication Data Units.

4. The method of claim 1 wherein
   the step of converting the Replication Data Units is initiated either:
      immediately before the step of executing the Deployment Component, or
      any time after receipt from the transport mechanism via a lazy conversion process.

5. The method of claim 1 wherein the vendor-neutral Discovery Component is selected based on a Service Level Agreement with a Disaster Recovery service that provides the destination site.

6. The method of claim 1 wherein the Replication Data Units include one or more virtual machine identifiers, networks, storage associations, application states and protected data.

7. A system for replication and/or recovery of protected resources located at a source site to a destination site comprising:
   at a source site that includes one or more of the protected resources,
      one or more source site processors for
         executing a Discovery Component, to identify one or more vendor-specific discovery tools for discovering aspects of the protected resources, including one or more aspects of infrastructure, platform, storage, network, or virtual machine protected resources;
         executing a Deployment Component, to deploy the one or more vendor-specific discovery tools on the source site according to a deployment schedule, to obtain data related to the protected resources;
         executing one or more other components, to
            generate one or more Replication Data Units from the data related to the protected resources and/or user input, the Replication Data Units containing data representing artifacts of the protected resources in a vendor-neutral data format; and
            forward the Replication Data Units to a transport mechanism;
   at the destination site,
      one or more destination site processors for executing program code to receive the Replication Data Units from the transport mechanism;

execute a Recovery Component for converting the Replication Data Units to vendor-specific Deployment Recovery Units; and execute a Deployment Component, using the vendor-specific Deployment Recovery Units to orchestrate a set of destination resources, thereby recovering the protected resources.

8. The system of claim 7 additionally comprising:

at the destination site, additional code to execute a second Discovery Component to identify one or more vendor-specific discovery tools for discovering aspects of the destination resources, including one or more aspects of infrastructure, platform, storage, network, or virtual machine resources.

9. The system of claim 7 wherein the Deployment Component is further for deploying storage for the Replication Data Units.

10. The system of claim 7 wherein converting the Replication Data Units is initiated either:

immediately before the step of executing the Deployment Component, or any time after receipt from the transport mechanism via a lazy conversion process.

11. The system of claim 7 wherein the Discovery Component is selected based on a Service Level Agreement with a Disaster Recovery service that provides the destination site.

12. The system of claim 7 wherein the step of executing the Discovery Component further comprises:

initiating the step of executing the Discovery Component through a generic interface that is not specific to any of the one or more vendor-specific discovery tools.

13. The system of claim 7 wherein the vendor-neutral Discovery Component is selected based on a Service Level Agreement with a Disaster Recovery service that provides the destination site.

* * * * *